(12) United States Patent
Chang et al.

(10) Patent No.: US 8,252,182 B1
(45) Date of Patent: Aug. 28, 2012

(54) SUBSURFACE UPFLOW WETLAND SYSTEM FOR NUTRIENT AND PATHOGEN REMOVAL IN WASTEWATER TREATMENT SYSTEMS

(75) Inventors: Ni-Bin Chang, Winter Springs, FL (US); Martin P. Wanielista, Winter Park, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 13/092,711

(22) Filed: Apr. 22, 2011

Related U.S. Application Data

(60) Continuation-in-part of application No. 13/011,341, filed on Jan. 21, 2011, now Pat. No. 8,101,079, which is a division of application No. 12/208,617, filed on Sep. 11, 2008, now Pat. No. 7,927,484, which is a continuation of application No. 13/092,711.

(60) Provisional application No. 61/327,403, filed on Apr. 23, 2010.

(51) Int. Cl.
*C02F 3/32* (2006.01)
*C02F 3/30* (2006.01)

(52) U.S. Cl. ... 210/602; 210/605; 210/617; 210/170.08; 210/259

(58) Field of Classification Search .................. 210/602, 210/605, 617, 620, 630, 170.08, 220, 252, 210/259, 532.2
See application file for complete search history.

(56) References Cited

U.S. PATENT DOCUMENTS

| | | | | |
|---|---|---|---|---|
| 4,990,449 A | * | 2/1991 | Caissel | 435/174 |
| 5,733,453 A | * | 3/1998 | DeBusk | 210/602 |
| 6,042,305 A | * | 3/2000 | Novich et al. | 405/266 |
| 7,029,586 B2 | * | 4/2006 | Austin et al. | 210/602 |
| 7,320,752 B2 | * | 1/2008 | Austin et al. | 210/602 |
| 7,361,268 B2 | * | 4/2008 | Ogden | 210/150 |
| 7,967,979 B2 | * | 6/2011 | Grewal et al. | 210/150 |
| 8,002,984 B1 | * | 8/2011 | Wanielista et al. | 210/602 |

OTHER PUBLICATIONS

Xuan, et al., Modeling Subsurface Upflow Wetlands Systems for Wastewater Effluent Treatment, Environmental Engineering Science, 2010, pp. 879-888, vol. 27, No. 10.
Xuan, et al., Simulation Analyses for Nutrient Removal in a Septic Tank Media Filter Using a System Dynamics Model, Department of Civil, Environmental, and Construction Engineering, 27 pages.

* cited by examiner

*Primary Examiner* — Fred Prince
(74) *Attorney, Agent, or Firm* — Brian S. Steinberger; Phyllis K. Wood; Law Offices of Brian S. Steinberger, P.A.

(57) ABSTRACT

Methods and systems for a subsurface upflow wetland for wastewater treatment that includes a series of parallel treatment cells, each cell including from bottom to top, a layer of gravel, a layer of sand over the gravel to remove pathogens from a septic effluent, a pollution control medium above the sand layer to remove nutrients, total suspended solid, and biochemical oxygen demand and a growth media mixture layered on top of the pollution control media to grow plants, and a gravity distribution system to distribute effluent to the series of parallel treatment cells. The pollution control medium includes at least one recycled material and at least one naturally occurring material. In an embodiment it includes recycled tire crumb, sand and limestone or recycled tire crumb, compost, sand and limestone.

25 Claims, 12 Drawing Sheets

| PARAMETER | DESCRIPTION | RATE EQUATIONS | VALUES | SOURCE |
|---|---|---|---|---|
| $k_a$ | AMMONIFICATION CONSTANT | $r_a = k_a C_{ON}$ | OPTIMIZED | BERAN AND KARGI, 2005 |
| gp | PLANT GROWTH RATE | $r_p = iNPgp$ | 0.5 | YI ET AL, 2009 |
| inp | PLANT N CONTENT | $r_p = iNPgp$ | MEASURED | YI ET AL, 2009 |
| $u_N$ | NITROSOMONAS GROWTH RATE | $r_n = \frac{u_N}{Y_N} e^{0.098(T-15)} [1 - 0.833(7.2 - pH)] (\frac{C_{AN}}{1+C_{AN}})(\frac{C_{DO}}{1.3+C_{DO}})$ | OPTIMIZED | KADLEC AND KNIGHT, 1996 |
| $Y_N$ | NITROSOMONAS YIELD COEFFICIENT | $r_n = \frac{u_N}{Y_N} e^{0.098(T-15)} [1 - 0.833(7.2 - pH)] (\frac{C_{AN}}{1+C_{AN}})(\frac{C_{DO}}{1.3+C_{DO}})$ | OPTIMIZED | KADLEC AND KNIGHT, 1996 |
| $K_{20d}$ | DENITRIFICATION RATE | $r_d = K_{20d} \theta_d^{(T-20)}$ | OPTIMIZED | MAYO AND MUTAMBA, 2005 |

Fig 4

☐ sand__ON(t) = sand__ON(t - dt) + (ON - sand_to_PC_ON - sand_AM) * dt
INIT sand__ON = 9138
INFLOWS:
  ⟿ ON = Inflow_L_per_day*Input_Organic_N_ug_per_liter/V_gravel
OUTFLOWS:
  ⟿ sand_to_PC_ON = Out_sand*sand__ON/V_sand
  ⟿ sand_AM = r_a_sand

SUBSURFACE UPFLOW WETLAND SYSTEM FOR NUTRIENT AND PATHOGEN REMOVAL IN WASTEWATER TREATMENT SYSTEMS

This invention is a continuation-in-part of U.S. application Ser. No. 13/011,341 filed on Jan. 21, 2011, now U.S. Pat. No. 8,101,079, which is a divisional application of U.S. application Ser. No. 12/208,617 filed on Sep. 11, 2008, now U.S. Pat. No. 7,927,484, and claims the benefit of priority to U.S. Provisional Application No. 61/327,403 filed on Apr. 23, 2010.

FIELD OF THE INVENTION

This invention relates to wastewater treatment and, in particular, to methods, systems and sorption media for combined sewer overflow and on-site wastewater treatment using a subsurface upflow wetland system for septic wastewater effluent treatment.

BACKGROUND AND PRIOR ART

Due to environmental health concern, the conventional centralized sewage collection, treatment, and disposal systems are no longer able to fully cater to the needs of treating on-site wastewater effluent which represent a large fraction of nutrient loads and pathogen impacts. They include not only nitrogen (N) and phosphorus (P), but also pathogens such as fecal coliform and E. coli which indicate the presence of other disease-causing bacteria flowing into aquatic system to adversely affect public health.

On-site Wastewater Treatment Systems:

While residents in towns and cities are served by centralized wastewater treatment facilities, more than 25 million homes, or 25 percent of the U.S. population, still use on-site wastewater treatment systems to meet their wastewater treatment and disposal needs. this number is increasing over time ending up more than 60 million people who had to depend on decentralized systems in early 2000s in the US (US EPA, 2002). Although properly managed on-site wastewater treatment and disposal system offers several advantages over centralized wastewater treatment facilities, conventional onsite system installations might not be adequate for minimizing nitrate contamination of groundwater, removing nutrient compounds, and attenuating pathogenic organisms. The most common type of on-site wastewater treatment (OSWT) is the septic system consisting of four main components: indoor plumbing, the septic tank, the drainfield, and the soil for percolation.

This drainfield allows wastewater to percolate into the surrounding soil (the vadose zone). Concentration of ammonium and nitrate in the vadose zone of conventional septic drainfield can be decreased by understanding the physical, chemical and biological process in a drainfield. Dispersion and diffusion of fluid through solids and adsorption-desorption may be the major physical-chemical process. Biological process involves nitrification and denitrification for nitrogen species. However, systems may create a higher, undesirable level of nutrient loading if improperly designed or managed (Hoover, 2002).

Among currently available on-site wastewater treatment and disposal system treatment technologies, passive on-site wastewater treatment and disposal systems are relatively more appealing than the active counterpart because of their consistent nutrient reduction capabilities and relatively low initial and operating costs (Hossain et al., 2009; Xuan et al., 2010a, Chang et al., 2010a, 2010b, 2010c, 2010d). Passive on-site wastewater treatment and disposal system is defined by the Florida Department of Health (FDOH) as a type of onsite sewage treatment and disposal system that excludes the use of aerator pumps and includes no more than one effluent dosing pump with mechanical and moving parts and uses reactive media to assist in nitrogen removal. Reactive media are materials that effluent from a septic tank or pretreatment device passes through prior to reaching the groundwater. Some innovative technologies used one or more reactive media to assist in nitrogen removal (Smith et al., 2008).

As the nutrient impact on groundwater quality becomes a big concern, conventional on-site wastewater treatments are no longer able to fully conform to the gradually tougher water quality standards. The current major concern of on-site wastewater treatment is that a large fraction of nutrient loads, such as nitrogen and phosphorus, flow into the aquatic system and adversely affect the water quality and public health. Such a development underlines the actual requirements for a more sustainable approach in handling on-site wastewater effluent disposal.

Comly (1945) has been credited with the first recognition of the risk of nitrite and nitrate in water. Methemoglobinemia or "blue-baby" syndrome, a potentially fatal blood disorder in infants, was reported to be caused by nitrate levels over 10 mg/L. After Comly's statement became widely accepted, the U.S. Public Health Service and U.S. Environmental Protection Agency successively set 10 mg/L of nitrate nitrogen and 1 mg/L of nitrite nitrogen as an upper limit for the safety of drinking water. However, there have been a number of reported cases of methemoglobinemia caused by nitrate at less than 10 ppm in drinking water. Besides the obvious cyanosis, there are a number of serious long-term, chronic impacts following exposure to high nitrate drinking water ranging from hypertrophy of the thyroid to cancer.

Elevated nutrient and pathogen levels in groundwater may cause health problems in children and may impair or destroy environmentally sensitive habitat. Increased nutrient and pathogen concentrations in surface waters may also lead to excess plant and algal growth and water pollution. When plants and algae die and decay, it results in lower dissolved oxygen levels and overall water quality.

The transition of nitrogen from one phase to another is commonly referred to as the nitrogen cycle. Ammonia combines with organic materials to create ammonium ($NH_4^+$). In the presence of ammonia-oxidizing bacteria (AOB) and nitrite-oxidizing bacteria (NOB), ammonium is converted to nitrite (NO2-) and further to nitrate (NO3-). These two reactions are collectively called nitrification. Denitrification, conversely, performed by denitrifying community, is an anaerobic respiration process using nitrate as a final electron acceptor and result in stepwise microbiological reduction of nitrate, nitrite, nitric oxide (NO), and nitrous oxide (N2O) to nitrogen gas (N2). Nitrate removal rates are directly influenced by the slow growing bacteria that govern nitrification and denitrification. Optimal temperature for the denitrifiers was found to be between 10° C. and 25° C.

Phosphorus may be removed in either an aerobic or anaerobic environment and is removed through sorption onto soil media. To remove nitrogen (N) and phosphorus (P), a wide range of alternative on-site wastewater treatment systems were developed. Aerobic treatment units are designed to treat wastewater rather than the conventional method with septic tanks alone. An aeration chamber is the most important compartment in aerobic treatment units where a pump supplying a constant flow of air and a stirring mechanism are used to oxygenate the water, creating optimum conditions for aerobic organisms to decompose organic compounds. The application of the aerobic treatment units may significantly reduce the health risk.

The main disadvantages associated with aerobic treatment units are the need for external power source and higher maintenance level required to ensure proper system operation. Sand filters in conjunction with a septic tank or an aerobic treatment unit are an alternative that is commonly used to provide additional treatment for effluent before it is discharged. The main function of sand filter is to reduce the amount of suspended solids and dissolved organic material present in the water. Microorganisms attached to the sand particles are able to aerobically digest the organic material within the wastewater. Havard et al. (2008) used six lateral flow filters (LFSFs) for their treatment of septic tank effluent. They evaluated the effects of slope and sand characteristics based on satisfactory performance of LFSFs: biological oxygen demand (BOD) (98.5%), total suspended solids (95.5%), and $E\ coli$ (5.4 log reduction). Phosphorus removal ranged from 98% in the fine sand to 71.2% in the coarse sand filter. TN removal ranged from 60 to 66%.

However, owners need to periodically rake and replace clogged surface sand. regardless of the disadvantages of each of these two on-site wastewater treatment alternatives mentioned above, it can be seen that denitrification in these two alternatives does not come up to expectations due to the presence of aerobic environment. To date, the United States Environmental Protection Agency and numerous states are imposing stricter standards for the release of TN (as a combined measurement of ammonia-N and nitrite-N and nitrate-N), phosphorus and pathogenic bacteria (normally coliforms) released by septic systems to conventional leach fields. Hence, there is an urgent need to find a more effective unit operation to help septic tank system meet the upcoming USEPA regulations.

Engineered, functionalized, and natural sorption media can be used to treat stormwater runoff, wastewater effluents, groundwater flows, landfill leachate and sources of drinking water for nutrient removal via physicochemical and microbiological processes (Chang et al., 2010b, 2010c). With such functionality, the biofilm can be formed on the surface of soil particles to allow microbes to assimilate nitrogen species although nitrogen cannot be removed by sorption directly. It is indicative that sorption provides an amenable environment for subsequent nitrification and denitrification. In the progress of media development, the media section and application is no longer only limited to the common natural mineral, such as sand, limestone, expanded clay, zeolite, pumice, bentonite, oyster shell. The media may also include a variety of industrial, domestic wastes people used to consider to be: sawdust, peat, compost, wheat straw, newspaper, wood chips, wood fibers, mulch, glass, ash, tire crumb, expanded shale, and soy meal hull (Chang et al., 2010b, 2010c). Last but not the least, the choice of media mixes depends on the desired length of service, residence time during an operating cycle, and pollutants in the wastewater. In many cases, the object to be moved is not only the nutrients, but also some other pollutants, such heavy metals, pathogens, pesticides, and toxins (TCE, PAH, etc.) (Chang et al., 2010b, 2010c).

Wetland has been playing an important role in water conservation, climate regulation, soil erosion control, flood storage for use in drought, environment purification, etc. Based on the same principle for wastewater purification by natural wetlands, the man-made constructed wetland with effective management can strengthen its ability to improve the effluent water quality. The wetland system removes nitrogen in the water through a variety of mechanisms including biological, physical and chemical reactions. Its' biological functions such as ammonification, nitrification-denitrification and plant uptake under appropriate conditions are regarded as the core players for nitrogen removal. Precipitation of particular form of phosphorus is the main path for phosphorus removal. Constructed wetland, an effective small-scale wastewater treatment system with low energy, maintenance requirements and operational costs has been widely used to treat various kinds of wastewater throughout the world.

While the constructed wetland showed its remarkable removal efficiency of organic matter, nutrient, pathogen, etc, the increased stricter water quality standard motivated many more advanced studies with regard to higher commercial, aesthetic, habitat and sustainable value. The constructed wetland can be divided into three main types according to the different hydrologic modes: free water surface (FWS) wetland, horizontal subsurface flow (HSSF) wetland and vertical flow (VF) wetland. FWS wetland includes emergent vegetation, soil or medium to support the emergent vegetation, and a water surface above the substrate. In the HSSF, the wastewater is fed in the inlet and passes the filter medium under the surface until it reaches the outlet zone through the subsurface pathways. Vertical flow constructed wetland generally consists of a gravel layer at the bottom topped with a sand layer. When intermittently feeding with a large batch, the wastewater percolates vertically until it reaches a drainage network. With a variety of natural wetland systems are used successfully at the field scale, the designed models of constructed wetland with systems dynamics characteristics have gradually gained growing attention during the past decades.

Within the constructed wetland, the transition of nitrogen from one phase to another is commonly referred to as the nitrogen cycle. Ammonia combines with organic materials to create ammonium ($NH_4^+$). In the presence of ammonia-oxidizing bacteria (AOB) and nitrite-oxidizing bacteria (NOB), ammonium is converted to nitrite ($NO_2$) and further to nitrate ($NO_3^-$). These two reactions are collectively called nitrification. Denitrification, conversely, performed by denitrifying community, is an anaerobic respiration process using nitrate as a final electron acceptor and results in stepwise microbiological reduction of nitrate, nitrite, nitric oxide (NO), nitrous oxide ($N_2O$) to nitrogen gas ($N_2$). Nitrate removal rates are directly influenced by the slow growing bacteria that govern nitrification and denitrification.

The term, Residence Time Distribution (RTD), characterizing chemical reactors was first proposed by Danckwerts in 1953, which was oftentimes used to discuss the type of mixing in constructed wetland). The RTD function is generally measured by injecting an impulse of tracer and measuring the tracer concentration as a function of time at interior wetland points as well as the outlet. Many wetland systems were modeled as a number, N, of stirred tank reactors in series.

$$RTD = \frac{N}{(N-1)!}\left(N\frac{t}{\tau}\right)^{N-1}\exp\left(-N\frac{t}{\tau}\right) \qquad (1)$$

Equation (1) can be considered as single continuous stirred tank reactor (CSTR) when N=1 and the plug flow reactor (PFR), N=∞.

In the earlier stage of designing the treatment model, the constructed wetlands were considered as a "black box". Scientists focused on the influent and effluent concentration and fit the result with the designed linear or power equation to build the relationship between them. Table 1 shows the regressions for wetland nitrogen and phosphorus removal of SSF wetlands. This kind of model oversimplified the constructed wetland treatment system, which has an extremely complicated physical, chemical and biological process. Not only the influent concentration and hydraulic retention time (HRT) but also hydrodynamic conditions, such as wetland dimension, porosity and conductivity of media can affect the removal efficiency of pollutants of concern. Gradually, the first-order kinetics equation or Monod type equations were widely accepted and applied to replace the regression method. Kadlec and Knight (1996) had summarized the nitrogen removal equations of modeling the constructed wetland in Table 2 which shows the parameter and corresponding formula of modeling the constructed wetland.

TABLE 1

| Parameters | Regression equations |
| --- | --- |
| Organic N | $C_2 = 0.1 C_1 + 1.0$ |
| Ammonium N | $C_2 = 0.46 C_1 + 3.3$ |
| Nitrate N | $C_2 = 0.62 C_1$ |
| Total Kjeldahl Nitrogen (TKN) | $C_2 = 0.752 C_1^{0.821} q^{0.076}$ |
| Total nitrogen (TN) | $C_2 = 0.46 C_1 + 0.124 q + 2.6$ |
| Phosphorus | $C_2 = 0.51 C_1^{1.10}$ |

Note: $C_2$=concentration at the outlet;
$C_1$=concentration at the inlet;
q=hydraulic loading rate

TABLE 2

| Parameter | Formula |
| --- | --- |
| Nitrifier growth rate ($u_{NITR}$) | $u_{NITR} = 172 e^{0.098(T-15)} [1 - 0.833(7.2 - \text{pH})]\left(\dfrac{C_{AN}}{1 + C_{AN}}\right)\left(\dfrac{C_{DO}}{1.3 + C_{DO}}\right)$ |
| Denitrifier growth rate ($U_{DENITR}$) | $u_{DENITR} = u_{DENITRmax}\left[\left(\dfrac{C_{NN}}{K_{DENITR} + C_{NN}}\right)\left(\dfrac{C_{ORGC}}{K_{ORGC} + C_{ORGC}}\right)\right]$ |
| Outlet concentration of ammonium nitrogen ($C_{AN}$) | $C_{AN} = (C_{ANi}) e^{-k_{AN}/(Q/A)} + \left(\dfrac{k_{ON}}{k_{AN} - k_{ON}}\right)(C_{ONi} - C_{ON}^*)(e^{-k_{ON}/(Q/A)} - e^{-k_{AN}/(Q/A)})$ |

Note:
  $K_{DENITRN}$=denitrification half-saturation constant, mg/L
  $K_{ORGC}$=organic nitrogen half saturation constant, mg/L
  $k_{ON}$, $k_{AN}$=first-order organic nitrogen, ammonium loss rate, g/m²/yr
  $C_{AN}$, $C_{DO}$, $C_{NN}$, $C_{ORGC}$, $C_{ON}$=concentration of ammonium, dissolved oxygen,
    nitrite+nitrate, organic carbon, organic nitrogen, mg/L
  $C_{ANi}$, $C_{ONi}$=inlet concentration of ammonium nitrogen, organic nitrogen, mg/L
  $C_{ON}^*$=background concentration of organic nitrogen, mg/L
  Q/A=hydraulic loading rate Tunçsiper, B., Ayaz, S. C., Akça., L., (2006), Modelling and evaluation of nitrogen removal performance in subsurface flow and free water surface constructed wetlands. Water Science & Technology, 53 (12), 111-120 simulated removal efficiencies of nitrogenous pollutants in SSF and FWS constructed wetland systems. Two types of the models, first-order plug flow and multiple regressions, were used to evaluate the system performances. Nitrification, denitrification and ammonification rate constants values in SSF and FWS systems were 0.898 d$^{-1}$, 0.486 d$^{-1}$ and 0.986 d$^{-1}$, and 0.541 d$^{-1}$, 0.502 d$^{-1}$, and 0.908 d$^{-1}$, respectively. They found that the first-order plug flow model clearly estimated slightly higher or lower values than observed when compared with the other models.

Jou, C. U., Chen, S. W., Kao, C. M., Lee, C. L. (2008), assessed the efficiency of a constructed wetland using a first-order biokinetic model. Wetlands, 28(1), 215-219 tried a constructed wetland for restoring a creek. The ecological treatment system removed 64.0% of suspended solids (SS), 43.0% of biochemical oxygen demand (BOD), and 11.0% of ammonia nitrogen. A first-order biokinetic model was used to estimate the reductions of BOD and nitrogenous biochemical oxygen demand (NBOD). They reported that the first-order biokinetic model appeared useful for estimating BOD and NBOD reductions in a constructed wetland. However, the fatal limitation of the first-order kinetics is that the constructed wetland system is required to keep the same flow rate, concentration and ideal plug flow.

To make the dynamic modeling of the constructed wetland processes more acceptable and flexible, Pastor, R., Benqlilou, C., Paz, D., Cardenas, G., Espuna, A., Puigjaner, L., (2003), Design optimization of constructed wetlands for wastewater treatment. Resources, Conservation and Recycling, 37(3), 193-204 proposed the design optimization of constructed wetland for wastewater treatment by combining a first principal model and an artificial neural network, which had a main advantage for better representing highly non-linear multi-input/multi-output system.

Tomenko, V., Ahmed, S., Popov, V., (2007), Modelling constructed wetland treatment system performance Ecological Modelling, 205, 355-364 compared multiple regression analysis (MRA) and two artificial neural networks—multi-layer perception (MLP) and radial basis function network (RBF) in terms of their accuracy and efficiency when applied to prediction of the biochemical oxygen demand (BOD) concentration at effluent and intermediate points of subsurface flow constructed wetlands. The dataset was normalized and transformed using principal component analysis (PCA) to increase the efficiency of the modeling. Artificial neural networks models were eventually cross-validated to find optimal network architectures and values of training algorithm parameters.

The models mentioned above just provide a limited understanding of specific items, which were even separately analyzed. The mechanistic approach for modeling constructed wetland systems has been highly regarded by people who prefer to understand the mystery of the whole wetland treatment process. Wynn, T. M., Liehr, S. K., (2001), Development of a constructed subsurface flow wetland simulation model, J. of Ecological Engineering. 16, 519-536 used a mechanistic compartmental simulation model, which included six linked submodels: the carbon cycle, the nitrogen cycle, a water balance, an oxygen balance, autotrophic bacteria growth and heterotrophic bacteria growth. Darcy's law was used to describe the flow through the media. The wetland was regarded as either a single continuously stirred tank reactor or a series of continuously stirred tank reactors instead of plug flow reactors, which was considered to be a better reactor model for simulating non-ideal plug flow. Monod kinetics was utilized to describe microbial growth rate. Transformations, such as nitrification and denitrification, were then linked directly to microbial growth. In general, except for the oxygen, the result of effluent BOD, organic nitrogen, ammonium and nitrate concentration fit the model well.

Langergraber G., (2001), Development of a simulation tool for subsurface flow constructed wetlands, Wiener Mitteilungen. 169, 207 presented a multi-component reactive transport module CW2D to model the biochemical transformation and degradation processes in SSF CWs. The mathematical structure of CW2D was based on that of the ASMs (Henze et al., 2000). The CW2D consisted of twelve components, nine process and forty-six parameters. The HYDRUS-2D was incorporated by using Richards equation to describe the variably saturated water flow conditions. Water uptake by plant roots was accounted as a sink term in the flow equation.

The components considered ammonium, nitrite, nitrate and nitrogen gas; dissolved oxygen; organic matter; inorganic phosphorus; heterotrophic and two species of autotrophic microorganisms. The rates of the biochemical elimination and transformation processes were described by using Monod-type of equation. Recently, Giraldi et al. (2009a, b) developed a mathematical model (FITOVERT) to analyze the hydrodynamics of a one-dimensional vertical flow CW under three different saturation conditions: complete saturation, partial saturation, and complete drainage by dosing rhodamine WT in steady state conditions. Richards equation was used for modeling the variably saturated conditions, while van Genuchten-Mualem functions was used to describe the relationships between pressure head, hydraulic conductivity, and water content. In particular, the porosity reduction due to bacteria growth and accumulation of particulate component (i.e. clogging process) can be simulated by FITOVERT.

When researchers revel in improving CWs, the complexity of the latest generation model insensibly deters the public prevalence of the CW model application. Massive complicated partial differential equation let the CW engineer flinch, which ties up the development of CW design and operation. The limited useful results from real practice further retard the calibration and optimization of the theoretical modeling work. To break this vicious cycle, some intuitive and accessible model should be developed to fit the gap. The objective of this research is to develop a simplified compartmental dynamics simulation model of subsurface upflow wetlands (SUW) to provide a dependable reference and tool for design of a subsurface upflow wetland, a competitive candidate of on-site wastewater treatment technologies.

SUMMARY OF THE INVENTION

A primary objective of this of the present invention is to provide methods, sorption media blends or mixes of a green sorption media filter with its unique sorption media recipe to remove nutrients and pathogens using mixtures of materials and plant species that provide for sorption, ion exchange, chemical precipitation, biological uptake, and filtration among other processes in a well configured mixed aerobic, anoxic, and anaerobic environment. The presence of some microbiological species may contribute to convert nitrogen to nitrogen gases resulting in net removal of nitrogen in wastewater.

A secondary objective of the invention is to provide methods, sorption media blends or mixes of materials and a system design using subsurface upflow layered structure with oxygenators for special wetland applications. The mixes of materials depend on the waste stream nutrient characteristics, residence time, and the projected life of the application.

A third objective of the invention is to provide methods, systems and sorption media for having applications for stormwater runoff combined sewer overflow and on-site wastewater flows from septic tank effluent.

A fourth objective of the invention is to provide methods, systems and sorption media including the use of special functionalized green filtration media and plant species for removal of phosphorus, nitrogen, and pathogen from stormwater and septic tank effluents using physical, chemical, and biological processes.

A fifth objective of the invention is to provide methods, sorption media and systems for wetland cells that contain an impermeable liner, a gravel substrate, fabric interlayer, sand, pollution control media, growth media and selected plants, the selected plant species further reinforce the unique filtration bed to aid in the nutrient and pathogen removal.

A sixth objective of the invention is to provide methods, systems and sorption media for subsurface upflow wetlands for nutrient and pathogen removal for pollution control management.

A seventh objective of the invention is to provide methods, systems and sorption media for lower maintenance burden, lower cost, higher benefit cost ratio, highly sustainable with material recycling and reuse, highly flexible with any landscape and built environment, highly applicable in dealing with drought impact or other emergency events when various sources of wastewater and stormwater can be polished for reuse, highly compatible with any type of Low Impact Development (LID) technologies in dealing with stormwater management, highly compatible with any type of architecture landscape design as an integral part of the green building program.

An eighth objective of the invention is to provide methods, systems and sorption media for nitrogen and phosphorus removal from stormwater and wastewater including catchment sources such as septic tank leachate, stormwater runoff, agricultural land uses, including runoff and enrichment of groundwater, and aquaculture operation, including shrimp farm, fish farm, etc.

A ninth objective of the invention is to provide methods, systems and sorption media having uses include but are not limited to consulting firms with business in on-site wastewater treatment processes, surface water quality restoration, and groundwater remediation processes, government agency with the needs for environmental restoration in Total Maximum Daily Loads (TMDLs) programs, industry with manufacturing capacity for facilitating stormwater management, on-site wastewater treatment, and groundwater remediation, and owners of agricultural and aquaculture systems. More specifically, septic tank system for on-site wastewater treatment systems and in particular in drainfields.

A tenth objective of the invention is to provide methods, sorption media and system wherein each wetland cell contains an impermeable liner, a gravel substrate, fabric interlayer, sand, pollution control media, growth media and selected plants.

An eleventh objective of the invention is to provide methods, systems and growth medium layer including 75% expanded clay, 10% vermiculite, and 15% peat moss that is used to support the root zone and a 30.48-cm (12-inch) and a pollution control medium layer including 50% citrus grove sand, 20% tire crumb, 10% compost, and 20% lime stone to help nutrient removal.

A first embodiment provides a subsurface upflow wetland for wastewater treatment that includes a series of parallel treatment cells, each cell including from bottom to top, a layer of gravel, a layer of sand over the gravel to remove pathogens from a septic effluent, a pollution control medium above the sand layer to remove nutrients, total suspended solid, and biochemical oxygen demand and a growth media mixture layered on top of the pollution control media to grow plants, and a gravity distribution system to distribute effluent to the series of parallel treatment cells. The pollution control medium includes at least one recycled material and at least one naturally occurring material. In an embodiment it includes recycled tire crumb, sand and limestone or recycled tire crumb, compost, sand and limestone.

A second embodiment provides a method for wastewater treatment that includes providing a horizontal underground cell to host an alternating cycle of aerobic and anoxic environments, layering gravel at the bottom of the horizontal underground cell, layering sand on the layer of gravel, mixing one or more recycled material selected from a group consisting essentially of tires and compost and one or more naturally occurring materials as a green sorption material mixture, layering a green sorption material mixture on top of the sand layer to provide an anoxic environment, layering a plant growth medium on top of the pollution control medium, and providing a gravity distribution system for distributing an influent into the horizontal underground cell to remove a nutrient content in wastewater. The method can be used in conjunction with an underground septic tank system as an alternating cycle of aerobic and anoxic environments to remove nutrient content from the influent.

The gravity distribution method can include the steps of providing an inlet in the gravel layer to introduce the effluent into the horizontal underground cell, providing a distribution pipe to distribute the effluent from the inlet to the horizontal underground cell, providing an outlet pipe to release overflow, and providing a flow meter to monitor the wastewater in the horizontal underground cell and can further include positioning one or more outlet pipes in the horizontal underground cell approximately between the growth medium and the pollution control medium and inserting an air inlet port with a fabric filter at bottom into the gravel layer to introduce more oxygen for promoting nitrification. The plant growth medium mixing step includes mixing expanded clay, vermiculite and peat moss as the plant growth medium.

Further objectives and advantages of this invention will be apparent from the following detailed description of preferred embodiments which are illustrated schematically in the accompanying drawings.

BRIEF DESCRIPTION OF THE FIGURES

FIG. 4 is a table showing a description of the parameters in the subsurface upflow wetland model.

DESCRIPTION OF THE PREFERRED EMBODIMENTS

Figure 1:
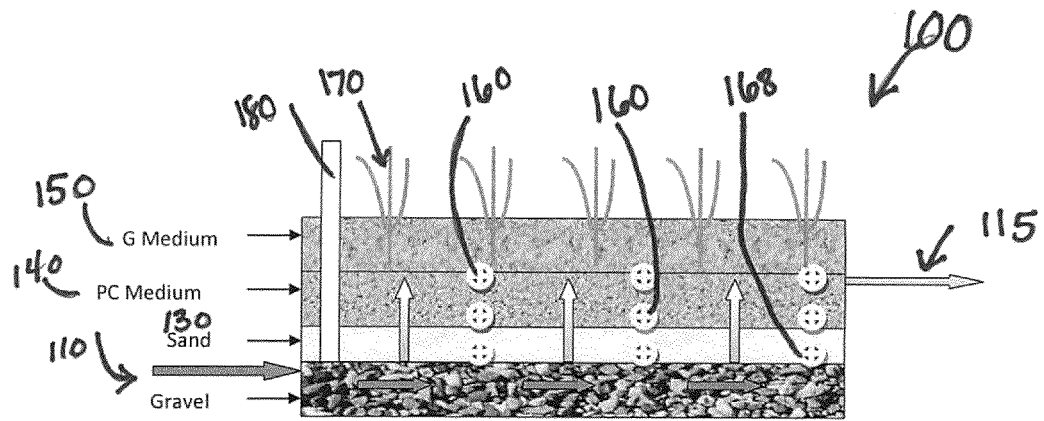
FIG. 1 is a cross-sectional view of a constructed wetland showing locations of the sample points in the wetland.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The following is a list of reference numerals used in the description and the drawings to identify components:
100 subsurface upflow wetland
110 inlet pipe
115 outlet pipe
120 gravel layer
130 sand layer
140 pollution control medium layer
150 plant growth medium layer
160 sampling ports
170 plants
180 air inlet port A subsurface upflow wetland (SUW) system receives septic tank effluent and was tested up to 454 m$^3$ (120 gallon) per day with each of the four SUW cells treating 30 gallons per day in our study. The septic tank before the SUWs has a size of 1000 gallon per day providing 2-3 days hydraulic retention time. The septic tank effluent enters a gravel-filled gravity distribution system including header pipe, equalization distribution box, distribution pipe, and flow meter. The four SUW cells are packed with special green sorption media. Within the full scale field study, a new set of green sorption media is used for both nutrient and pathogen removal in the SUW.

An innovative upflow operation is used. The operation includes a high porosity gravel as the substrate at the bottom, vertical piping to introduce oxygen to the bottom, and an outlet that is higher than inlet. The design fosters an upflow hydraulic pattern and an amenable nitrification-denitrification environment as well as minimizing clogging and flooding, which overcomes the main disadvantage of the conventional subsurface flow wetlands. Such a design reduces the effect of rainwater since most rainwater drains from the higher outlet directly instead of mixing with the wastewater, which provides more accurate evaluation of the performance of the SUW.

Through various physical, chemical, and biological processes, most bacteria and viruses in wastewater, as well as nutrients, are consumed and intercepted as the wastewater effluent travels up successively through the gravel layer, sand layer (i.e., aerobic layer at the bottom) and pollution control layer, growth media layer (i.e., anaerobic layer in the middle) before reaching the root zone. Combined with the plant species on the top of the growth media, the SUW may promote pathogen, nitrogen and phosphorus removal via nitrification, denitrification adsorption, absorption, ion exchange, filtration, and precipitation collectively.

Subsurface Upflow Constructed Wetlands:

Constructed wetlands have been popular in ecological engineering regime; yet modeling the physical, chemical and biological processes within these wetlands is a long-standing challenge in the past decades. To be in concert with field-scale pilot testing of a new-generation subsurface upflow wetland (SUW) system, the description of the present invention highlights an advancement of modeling the SUW system with a layer-structured compartmental simulation model. This is the first wetland model of its kind in the world to address the complexity between plant nutrient uptake and media sorption. Such a system dynamics model using STELLA® as a means for a graphical formulation was applied to illustrate the essential mechanism of the nitrification and denitrification processes within a sorption media-based SUW system, which can be recognized as one of the major passive on-site wastewater treatment technologies in this decade. Model calibration and validation received fairly good R-squared values of 0.9998 and 0.9644, respectively. Such a good agreement with the measured data confirms that the developed system dynamics model may provide a reliable tool for designing this particular type of constructed wetland. This also entails the significant movement of linking green building with green infrastructure as part of the "urbanization for nature".

The co-inventors used a subsurface upflow constructed wetland (SUW) system receiving septic effluent from a student dormitory handled 454 liters (120 gallons) per day influent for a wastewater treatment study using the green sorption media along with plant species. The wastewater was intermittently pumped into the constructed wetland by about 15.12 liters (4 gallons) at a time. The co-inventors had previously shown that green sorption medium consisting of recycled and natural materials provide a favorable environment for nutrient removal as described in U.S. patent application Ser. Nos. 12/208,617 filed on Sep. 11, 2008, 12/583,501 filed on Aug. 21, 2009 and 13/011,341 filed on Jan. 21, 2011, which are incorporated herein by reference.

For the experiment, there were four parallel cells in this test bed each with the dimensions of 1.52 m wide×3.05 m long× 0.91 m deep (5 ft wide×10 ft long×3 ft deep). Each of four cells consisted of an impermeable liner, a gravel substrate layer 120, a sand layer 130, a green sorption media layer 140, a growth media layer 150 and selected plants 170; a gravel-filled gravity distribution system including header pipe, distribution pipe, collection pipe, flow meter and a planted bed of special green sorption media with an underdrain collection system. PVC pipes 180 with a fabric filter at bottom were inserted into the gravel layer close to the inlet of each cell to introduce more oxygen for promoting nitrification. Three sets of plant species were tested against the control case where there was no plant species.

Since gravel with the higher porosity was used as the substrate at the bottom of each cell, an innovative upflow (i.e. Outlet of SUW is higher than inlet) design was introduced to foster an uniform upflow hydraulic pattern and an amenable nitrification-denitrification environment as well as avoid clogging and flooding, which overcomes the main disadvantage of the conventional subsurface flow wetlands. Besides, such design may result in maximal reduction of the effect of stormwater. Part of stormwater drains from the higher outlet directly instead of mixing with the wastewater, which provides us more accurate evaluation of our designed media performance. Through various physical, chemical and biological processes, most bacteria and viruses in wastewater, as well as nutrients, are consumed and intercepted as the wastewater effluent travels up through the pollution control layer (i.e., aerobic layer at the bottom) and growth media layer (i.e., anaerobic layer in the middle) before reaching the root zone. Combined with the gravel layer and the sand layer laid down beneath the pollution control layer and the plant species on the top of the growth media, the unique SUW may promote the pathogen, nitrogen and phosphorus removal via nitrification, denitrification adsorption, absorption, ion exchange, filtration, and precipitation collectively. Three kinds of plant species are tested against the control case with no plant species.

Once the gravel layer is fully saturated, the water level would rise up gradually, passing through the sand 130 and pollution control medium layer 140 up to the outlet 115. In each wetland, two customized oxygenators were inserted on both sides of inlet into the gravel layer 120 to enhance the nitrification at the bottom of the wetland cells so as to fulfill the design ideas configured for the SUW. The samplers 160 were installed at the interface between different layers with three depths as shown in FIG. 1.

As an important component of wetland system, plant species have an irreplaceable function in the pollutants purification. In the subsurface wetland system, plant rhizosphere provides a potential attachment site for denitrifying bacteria in an anaerobic environment. Based on the characteristics of oxygen transmission, it shows an aerobic-anaerobic-anoxic state around the rhizosphere, the equivalent of series or parallel anaerobic-anoxic-oxic (A2O) processing unit. Aerobic areas near the root zone are conducive to nitrification and anaerobic areas away from the roots work for denitrification, both of which may perform the final clean-up of residual nitrogen in the septic effluent. Nitrate may thus be effectively removed by denitrification in rhizospheric zones. TN and TP can be removed if the plants are harvested routinely.

The main criteria for choosing plants in the study included: 1) native—long term survival or minimal environmental problems; 2) perennial—function all year long and don't need to replant after harvesting; 3) good rooting system—help nitrification; 4) high yield—evaporate more water since yield and water use are closely correlated (i.e., this criteria is flexible); 5) high protein content—plant will take more nitrogen since protein content is correlated with nitrogen content; and 6) tolerate trimming or grazing—harvest biomass and consequently remove nutrients. Three kinds of herbaceous perennial plants including Canna (*Canna Flaccida*), Blue flag (*Iris versicolor* L.), and Bulrush (*Juncus effusus* L.) were eventually selected due to the features of the local availability, biomass production, nutrient content and the similar size. Seedlings of those three kinds of plant were purchased from local nursery and planted two months before the experiment period. Since the wetland plants had been acclimated and taken shape during the experiment, the plant growing rate was treated as a constant for simplification.

The co-inventors decided to follow six criteria to screen those possible sorption media to support both pollution control and plant growth: 1) the relevance of nitrification or denitrification process or both, 2) the hydraulic permeability, 3) the cost level, 4) the removal efficiency as evidenced in the literature with regard to adsorption, precipitation, and filtration capacity, 5) the availability in Florida, and 6) additional environmental benefits. All of the four treatment units (cells)

in our wetland system were filled from bottom to top with gravel, sand, "Pollution Control Media" denoted as PC medium hereafter and "Expanded Clay Growth Media" denoted as G medium hereafter. The 15.24 (6-inch) sand layer had the main function of remove the pathogen from the septic effluent and worked as a buffer layer between gravel and PC media layers.

After a long-term trial and error, the final recipe 30.48-cm (12-inch) layer of pollution control media included approximately 50% sand (Cytrus grove sand used in the experiment), approximately 20% tire crumb, approximately 10% compost and approximately 20% limestone to remove most of the nutrients, total suspended solids, and BOD, at the depth of 30.48-cm (12 inches) beneath the G media layer. The top layer was a 30.48-cm (12-inch) growth media layer having approximately 75% expanded clay, approximately 10% vermiculite, and approximately 15% peat moss was used to support the root zone. Since nitrification is considered to be the primary rate-limiting step for nitrogen removal unless the wastewaters are pre-nitrified or the oxygen can be diffused more efficiently into the upper layer of the root zone via some specific growth media, the expanded clay growth media was used to ensure vibrant plant growth and the efficient oxygen diffusion. Once the wastewater fully saturated the gravel layer, the water level would rise up gradually, passing through the sand and PC medium layer up to the outlet as shown in FIG. 1.

Chowdhury et al. (2008) reported a bromide tracer study in a similar subsurface upflow wetland. They found that a gravel layer added at bottom caused the flow to be mostly in the vertical direction, which provided strong evidence for our hydraulic pattern hypothesis. The samplers were installed at the interface between different layers with three depths. Horizontally, the samplers in the four wetland cells were located at approximately 33%, 67% and 100% along the length of the wetland. Sample identities (IDs) here were defined for following discussion as below: 1) "port B": mixture of bottom three samples, 2) "port M": mixture of middle three samples, 3) "port T": mixture of top three samples. Fig. is a side view that illustrates the wetland configuration in this experiment.

The water quality in wetland system was monitored weekly from Sep. 2 to Sep. 30 in 2009. Dissolved oxygen (DO), pH, and temperature were measured on site by HACH HQd field case. Besides, a 24-hr composite sample was taken from every sampling port periodically for measuring ammonium-nitrogen (NH4+), nitrite-nitrogen (NO2-N), nitrate-nitrogen (NO3-N), TN and TP. The amount of the sample was taken in proportion to the actual waste load. A clean polyethylene jug was used to store each sample for other parameters analysis. Once the samples were taken, the containers would be stored at a chilled cooler (4° C.) until the 24-hr composite samples were completed. Samples that require appropriate preservatives were taken care of according to quality assurance/quality control (QA/QC) protocol: 200-ml of each sample must be filtered through a 0.45 micron filter. 100-ml of the filtered samples shall be preserved at pH less than 2.0. Each sample was delivered to the external certified laboratory in an appropriate ice chest within the same day to ensure the integrity of the samples. At the beginning and the end of the study period, plant samples were collected randomly in a 30×30 cm2 area and analyzed for measuring nitrogen content in plant tissue. Plant samples were sent to an agricultural lab located in Orange City, Fla.

A system dynamics model was developed. System dynamics, being designed based on system thinking, is a well-established methodology for studying and managing complex feedback systems. It requires constructing the unique "causal loop diagrams" or "stock and flow diagram" to form a system dynamics model for applications. System dynamics modeling has been used to address practically every sort of feedback system the application matrix has covered several issues, including environmental impact analysis of coalfields, lake eutrophication assessment, pesticide control, wetland metal balance, groundwater recharge, lake watershed management, river pollution control, and solid waste management.

As one of the most advanced graphical system programming dynamic software packages, STELLA® was used to develop the mathematical model for the SUW in this study to address mechanistic processes. It shows a very friendly intuitive icon-based graphical interface. As icons of stock and flow are drawn on front canvas layer, model equations are automatically generated on the equation layer beneath. Simulation runs can be carried out entirely along the prescribed timeline. Results can be presented via graphs, tables, animations with the running simulation.

There are five main nitrogen transformations in constructed wetlands.

1. Organic nitrogen to ammonium nitrogen (ammonification or mineralization). Organic nitrogen cannot be extracted by plants directly but is gradually transformed to $NH_4^+$ by heterotrophic microorganisms:

$$NH_2CONH_2 + H_2O \rightarrow 2NH_3 + CO_2 \tag{2}$$

$$NH_3 + H_2O \leftrightarrow NH_4^+ + OH^- \tag{3}$$

2. Ammonium nitrogen to nitrate nitrogen (nitrification). In aerobic oxidized condition, ammonium transforms to $NO_3^-$ through the process of nitrification in two steps by AOB:

$$2NH_4^+ + 3O_2 \rightarrow 2NO_2^- + 2H_2O + 4H^+ \tag{4}$$

By NOB:

$$2NO_2^- + O_2 \rightarrow 2NO_3^- \tag{5}$$

When there is adequate oxygen available, nitrification can also occur in the oxidized rhizosphere of plants.

3. Nitrate nitrogen to gaseous nitrogen (denitrification). Denitrifiers use the oxygen from $NO_3^-$ instead of $O_2$ to convert $NO_3^-$ to nitrogen oxide and $N_2$.

$$NO_3^- + 0.833CH_3OH \rightarrow 0.5N_2 + 0.833CO_2 + 1.167H_2O + OH^- \tag{6}$$

$$NO_3^- + 0.208C_6H_{12}O_6 + \rightarrow 0.5N_2 + 1.25CO_2 + 0.75H_2O + OH^- \tag{7}$$

4. Nitrate or ammonium nitrogen to organic nitrogen (assimilation or immobilization). Immobilization can be considered as the reverse reaction of mineralization. Inorganic nitrogen ($NO_3^-$ and $NH_4^+$) is converted to organic nitrogen by microbes and used by plants, which roughly is counted as plant uptake in the model.

Figure 2:
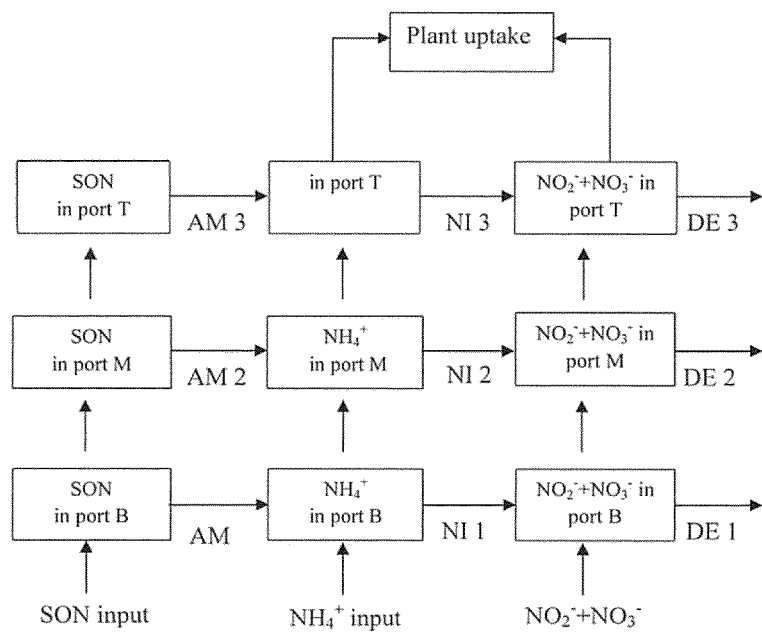
FIG. 2 shows a conceptual model of nitrogen removal in subsurface upflow wetland.
Figure 3:
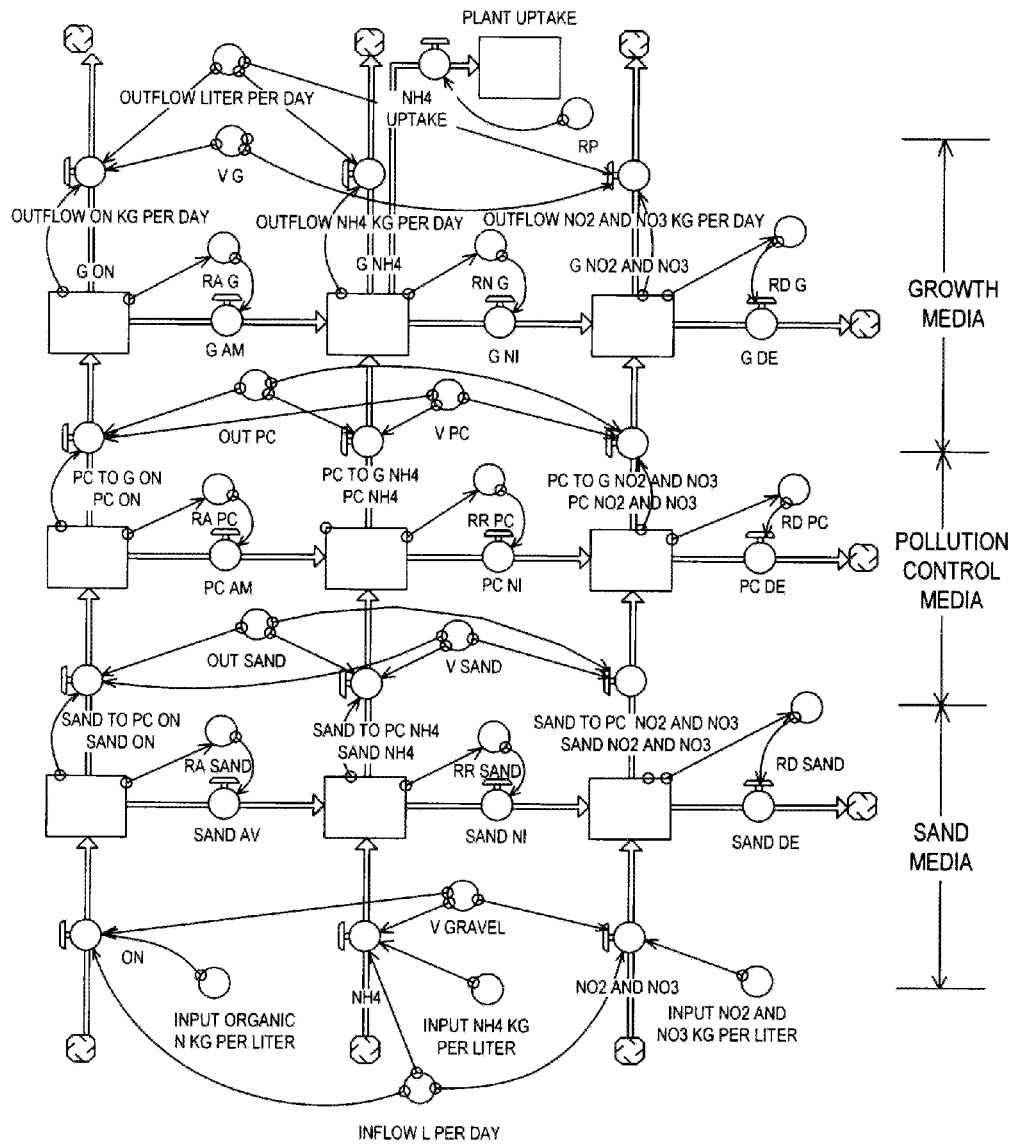
FIG. 3 is a flow diagram showing a nitrogen removal model.

5. Biomass nitrogen to organic nitrogen (decomposition). Since the plant grew well and had no residue in late summer, this part of nitrogen transformation can be ignored. Assume that each media layer was a CSTR. Based on the above understanding, the conceptual model for nitrogen removal of subsurface upflow wetland is shown in FIG. 2. In FIG. 2 SON=Soluble Organic Nitrogen; AM=ammonification; NI=nitrification; and DE=denitrification The stock and flow diagram of nitrogen removal in subsurface upflow wetland using STELLA® simulation program is shown in FIG. 3 in which the modeling structure follows the layered structure for nitrogen removal. Table 3 below shows the description of symbols in the flow diagram of FIG. 3 by taking the sand layer as an example.

TABLE 3

| Symbol | Description |
|---|---|
| "sand ON" | ON (μg/day) in sand layer; |
| "sand $NH_4$" | $NH_4$ (μg/day) in sand layer; |
| "sand $NO_2$ and $NO_3$" | $NO_2 + NO_3$ (μg/day) in sand layer; |
| "sand AM" | ammonification (μg/day) in sand layer |
| "sand NI" | nitrification (μg/day) in sand layer |
| "sand DE" | denitrification (μg/day) in sand layer |
| "sand to PC ON" | ON (μg/day) transfer from sand layer to PC layer |
| "sand to PC $NH_4$" | $NH_4$ (μg/day) transfer from sand layer to PC layer |
| "sand to PC $NO_2$ and $NO_3$" | $NO_2 + NO_3$ (μg/day) transfer from sand layer to PC layer |
| "$r_a$ sand" | ammonification rate (day$^{-1}$) in sand layer |
| "$r_n$ sand" | nitrification rate (day$^{-1}$) in sand layer |
| "$r_d$ sand" | denitrification rate (day$^{-1}$) in sand layer |

The equations below are used to predict the organic nitrogen (ON), $NH_4$ and the sum of nitrite and nitrate ($NO_2+NO_3$). The unit form, μg/L/day, was used for all flows and stocks. Only plant uptake is a real and ultimate stock as shown in FIG. 3. The rest of nine stocks have their own outflow to reach a steady state condition. Thus, the value in stock can be represented as the "instantaneous concentration" in a unit volume or a point (i.e. sampling port). Assume that the upflow rate decreased linearly due to the evapotranspiration and plant uptake with the increase of the water level. V is considered as the effective volume (product of volume and porosity) of each layer where water flows. The $NO_2+NO_3$ concentrations in all layers are so low that the $NO_2+NO_3$ uptake by plant is negligible. FIG. 4 shows the model equations automatically generated in the Equation interface of STELLA® with the measured data as initial value. In experiments conducted for the present invention, September was picked as the experiment period when wetland plants had been taken shape. So it was assumed to be a constant rate of biomass production for simplification. The rest of the parameters need to be measured or assumed so that they may be determined holistically via the model calibration stage as summarized by FIG. 5.

$$dON/dt = \frac{Q_{in}}{V_{in}}ON_{in} - \frac{Q_{out}}{V_{out}}ON_{out} - r_a \quad (8)$$

$$dNH_4/dt = \qquad (9)$$
$$\frac{Q_{in}}{V_{in}}NH_{4in} - \frac{Q_{out}}{V_{out}}NH_{4out} + r_a - r_n - r_p(\text{only in } G \text{ media layer})$$

$$d(NO_2 + NO_3)/dt = \qquad (10)$$
$$\frac{Q_{in}}{V_{in}}(NO_2 + NO_3)_{in} - \frac{Q_{out}}{V_{out}}(NO_2 + NO_3)_{out} + r_n - r_d$$

Wetland cell 1 was selected to develop the system dynamics model. Since a constant rate of plant growth was assumed, the third run considered to have the average rate of plant growth was used to do the model validation in the next subsection. The average value of results from the other three runs and the hydraulics values listed in Table 6 were used to calibrate the SUW nitrogen removal dynamic model.

Runge-Kutta 4 was used as the integration method. The nitrification has a wide range of optimum pH of 7.0 to 9.0 (Sajuni et al., 2010). The pH below 7.0 adversely effects on ammonia oxidation. Besides, the empirical formula is valid for water temperatures between about 5 and 30° C. The expression of nitrification rate was finally reorganized as Eq. 11. The model calibration started from adjusting the ammonification rate (i.e., the nutrient source, ON, in sand layer) to minimize the discrepancies between modeled and measured values. Then the model calibration can be moved along the direction of nutrient transport (i.e. from bottom to top) and nitrogen transformation (i.e. from left to right) in relation to all three parameters of interest.

Figures 5, 6:
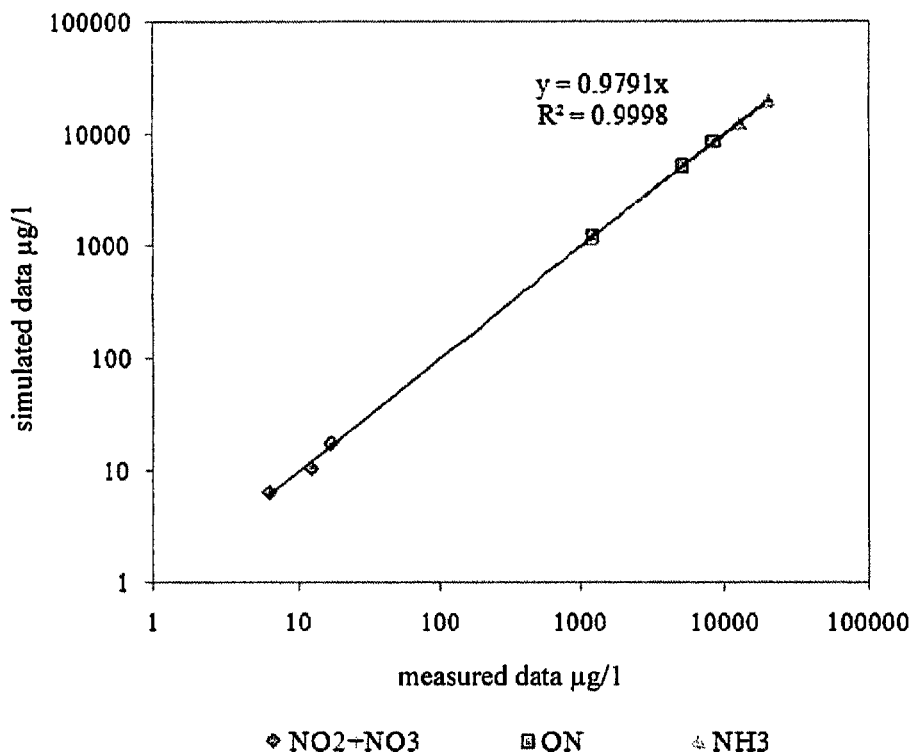
FIG. 5 is a model equation related to "sand ON" stock.
FIG. 6 is a graph showing the correlation between the measured and simulated values in model calibration.

The three parameters were intimately related to rate of ammonification, nitrification and denitrification, and their final values were determined within an effort of model calibration based on other measured parameter values assigned in Table 4 which shows hydraulics values used in surface upflow wetland model. After such errands of model calibration, the final agreement between the measured and simulated values of organic nitrogen (ON), ammonium ($NH_4$) and the sum of nitrite and nitrate ($NO_2+NO_3$) is shown in FIG. 6. The slope of the regression line was 0.9791, and the correlation ($R^2$) was 0.9998, which supports the model calibration.

$$r_n = \frac{u_N}{Y_N} C_T C_{pH} \left( \frac{C_{DO}}{1.3 + C_{DO}} \right) C_{AN} \quad (11)$$

$$C_T = \begin{cases} e^{0.098(T-15)}, & \text{for } T < 30°\text{C.}; \\ e^{0.098(30-15)}, & \text{for } T \geq 30°\text{C.}; \end{cases}$$

$$C_{pH} = \begin{cases} 1 - 0.833(7.0 - \text{pH}), & \text{for pH} < 7.0; \\ 1, & \text{for pH} \geq 7.0; \end{cases}$$

TABLE 4

| Parameters | Description | Values |
|---|---|---|
| $Q_{in}$ | Inflow rate | 113.4 L/d |
| $Q_{sand}$ | Flow rate out of sand layer | 93 L/d |
| $Q_{PC}$ | Flow rate out of PC media layer | 52 L/d |
| $Q_{out}$ | Outflow rate | 31.5 L/d |
| $\Phi_g$ | Porosity of gravel | 0.34 |
| $\Phi_s$ | Porosity of sand | 0.43 |
| $\Phi_{PC}$ | Porosity of PC media | 0.42 |
| $\Phi_G$ | Porosity of G media | 0.50 |

TABLE 5

| | Rate equations | Unit | In sand layer | In PC media layer | In G media layer |
|---|---|---|---|---|---|
| $k_a$ | $r_a = k_a C_{ON}$ | day$^{-1}$ | 0.08 | 0.42 | 0.28 |
| $\frac{u_N}{Y_N}$ | $r_n = \frac{u_N}{Y_N} C_T C_{pH}\left(\frac{C_{DO}}{1.3+C_{DO}}\right)C_{AN}$ | day$^{-1}$ | 0.12 | 0.18 | 0.37 |
| DO | $r_n = \frac{u_N}{Y_N} C_T C_{pH}\left(\frac{C_{DO}}{1.3+C_{DO}}\right)C_{AN}$ | mg/L | 3.41 | 3.39 | 2.51 |

TABLE 5-continued

| | Rate equations | Unit | In sand layer | In PC media layer | In G media layer |
|---|---|---|---|---|---|
| pH | $r_n = \frac{u_N}{Y_N} C_T C_{pH} \left(\frac{C_{DO}}{1.3 + C_{DO}}\right) C_{AN}$ | N/A | 7.02 | 7.00 | 7.01 |
| T | $r_n = \frac{u_N}{Y_N} C_T C_{pH} \left(\frac{C_{DO}}{1.3 + C_{DO}}\right) C_{AN}$ | °C. | 29.94 | 30.08 | 29.69 |
| $K_{20d}$ | $r_d = K_{20d} \theta_d^{(T-20)} C_{NN}$ | day$^{-1}$ | 180 | 235 | 80 |
| $r_p$ | $r_p = iNPgp$ | day$^{-1}$ | N/A | N/A | 140 |

The experimental data for third run was used for model validation. Table 6 lists the measured environmental values of the third run including temperature, pH and dissolved oxygen values used in model validation.

TABLE 6

| | DO (mg/L) | pH (unitless) | Temperature (° C.) |
|---|---|---|---|
| Sand layer | 3.02 | 7.77 | 32.23 |
| PC layer | 2.68 | 7.40 | 32.37 |
| G layer | 2.73 | 7.44 | 33.04 |

Figure 7:
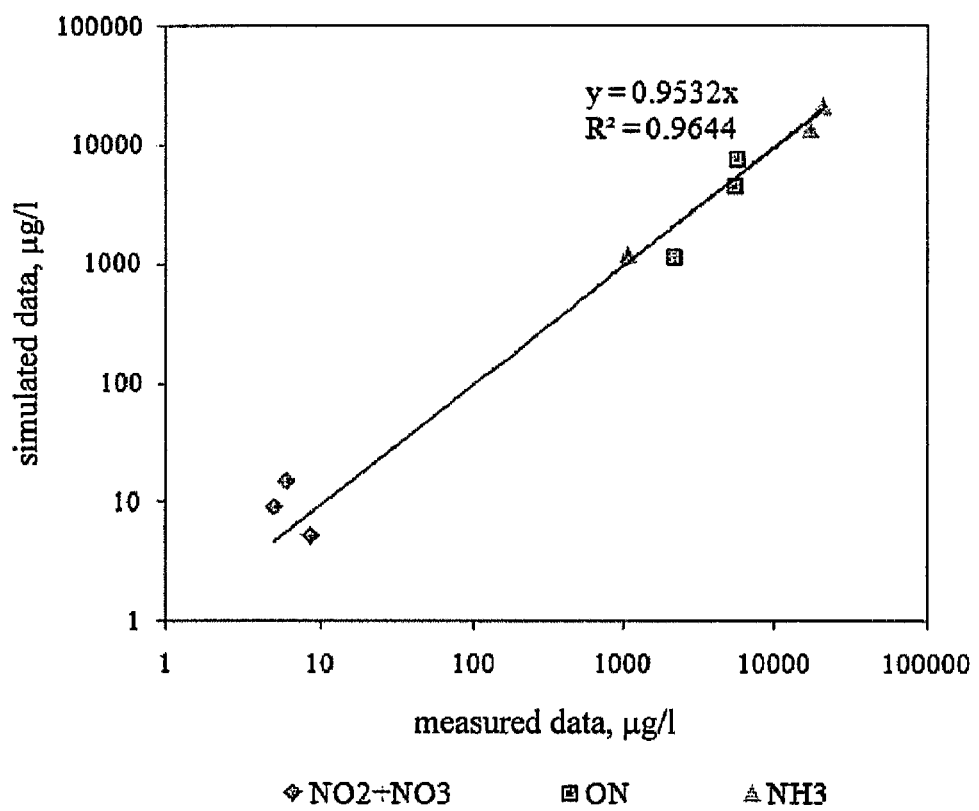
FIG. 7 is a graph showing the correlation between the measured and simulated values in model calibration.
Figure 8A:
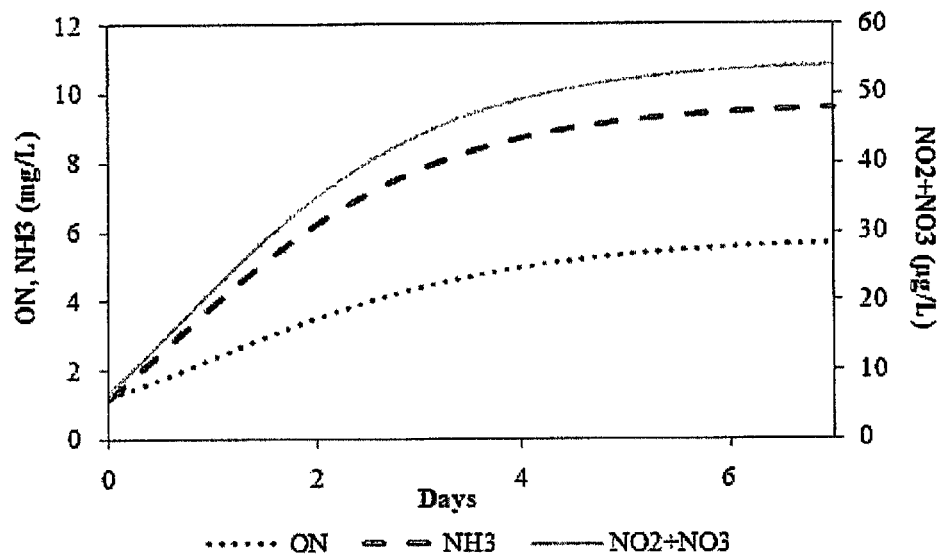
FIG. 8*a* is a graph showing effluent quality of wastewater loading at 378 liters per day (100 GPD).
Figure 8B:
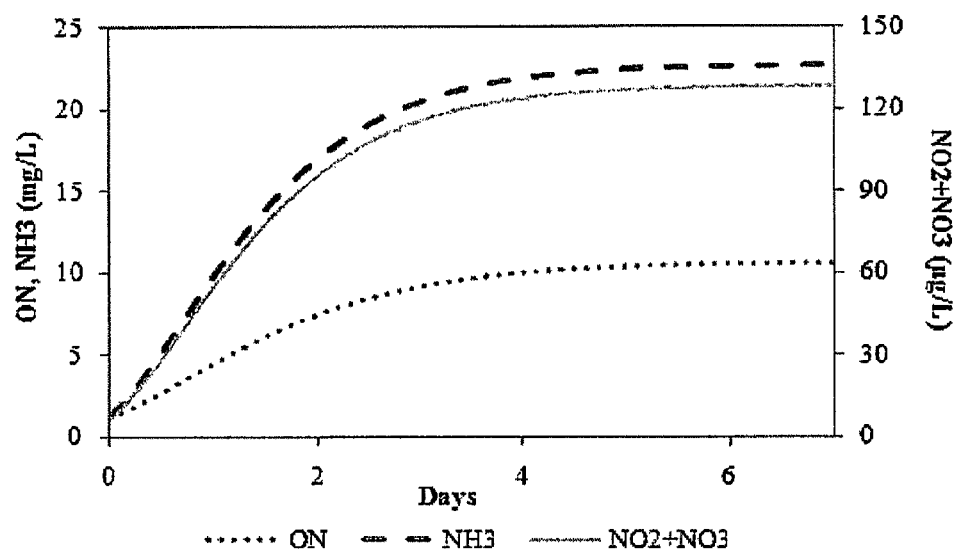
FIG. 8*b* is a graph showing effluent quality of wastewater loading at 756 liters per day (200 GPD).
Figure 8C:
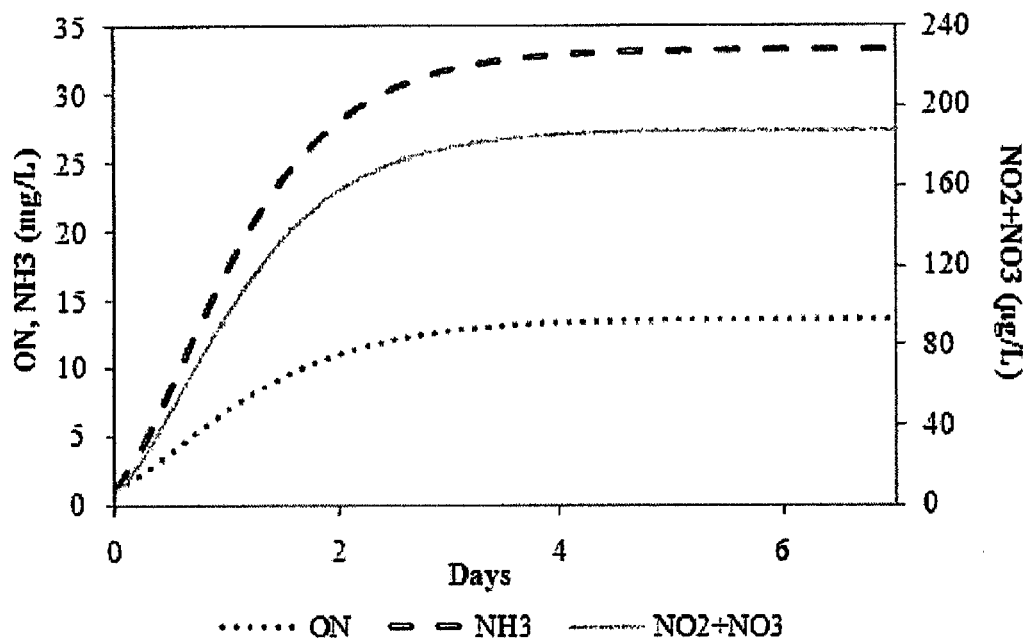
FIG. 8*c* is a graph showing effluent quality of wastewater loading at 1134 liters per day (300 GPD).
Figure 8D:
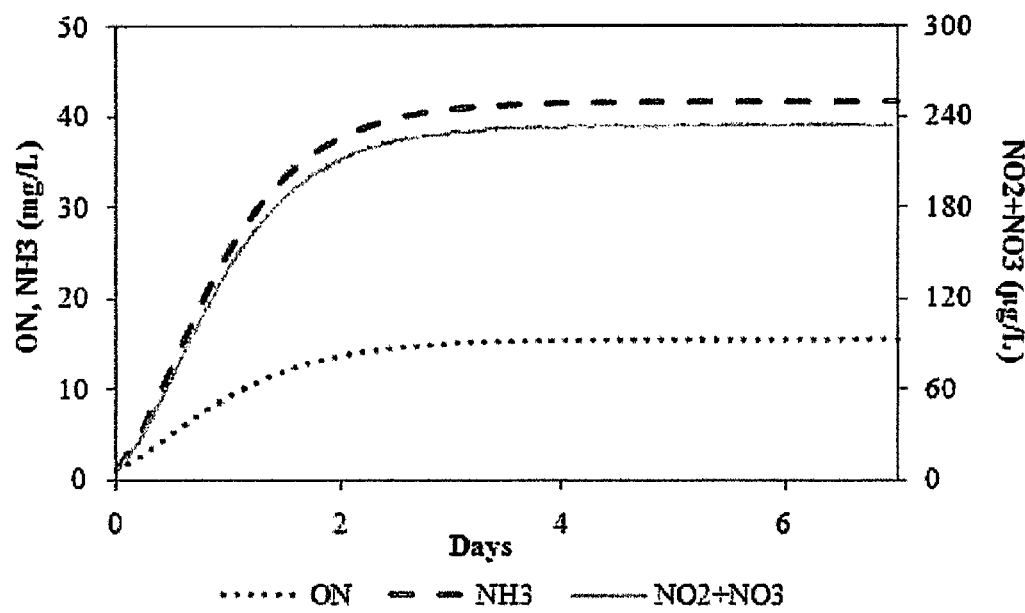
FIG. 8*d* is a graph showing effluent quality of wastewater loading at 1512 liters per day (400 GPD).

The correlation between the measured and simulated values is shown in FIG. 7. The slope of the regression line was 0.9532 and correlation ($R^2$) was about 0.9644, which shows the model validation, corroborating previous calibrated data shown in Table 5. The values of sum of nitrite and nitrate ($NO_2+NO_3$) led to a slightly lower $R^2$ value. The extremely low concentration, which is close to the lower detection limit, might increase the deviation. The ammonification rate constant ($k_a$) in PC media increased up to fivefold compared with that in sand layer. The denitrification rate constant in PC media was 30% more than that in sand layer and three times as much as in G media. May, E. et al, (1990), Chemical and microbiological processes in gravel-bed hydroponic (GBH) systems for sewage treatment, in: Constructed Wetlands in Water Pollution Control, P. F. Cooper and B. C. Findlater (Eds.), Pergamon Press, Oxford, UK, 33-40 found that most nitrifiers were associated with roots rather than the gravel layer. Similarly, present experiments showed higher specific yield of nitrification rate ($u_N/Y_N$) in G media, which is the root zone layer.

The experiments confirmed the exceptional ability of wetlands for nutrients removal. However, the wetland 1 just treated the wastewater with the loading of 113.4 liters per day (30 gallons per day), which is smaller than the amount of wastewater produced from most common families. People might wonder how the subsurface upflow wetland worked under higher loading to fully meet the requirement of household wastewater treatment.

In such a case, the superiority of the dynamic simulation model is manifested. A new wastewater loading number input and a gentle press on "run" button relieves all the effort to manually increase the wastewater loading into the wetland and collect the water samples for analyses. Keeping the inflow concentration for all three forms of nitrogen: 14.0 mg/L of organic nitrogen (ON), 55.1 mg/L of ammonium ($NH_4$) and 7.0 µg/L of the sum of nitrite and nitrate ($NO_2+NO_3$), 378 liters per day (100 gallons per day), 576 liters per day (200 gallons per day), 1134 liters per day (300 gallons per day), and 1512 liters per day (400 gallons per day) were input as the inflow rate into the model interface, all the parameters were kept the same as used in model calibration. The concentration of organic nitrogen (ON), ammonium ($NH_4$) and the sum of nitrite and nitrate ($NO_2+NO_3$) from the outlet were as shown graphically in FIGS. 8a-d which show effluent quality of wastewater loading a) 378 liters per day (100 GPD), b) 756 liters per day (200 GPD), c) 1134 liters per day (300 GPD) and d) 1512 liters per day (400 GPD).

With the flow rate of 378 liters per day, three forms of nitrogen keep increasing with the time. With the increase up to fourfold wastewater loading, the concentrations of $NH_4$ and $NO_2+NO_3$ increased with almost the same ratio. The ON concentration had a lower increase after triple loading. With the loading of 1,512 liters per day, the concentrations of $NH_4$, $NO_2+NO_3$ and ON were less than 42 mg/L, 250 µg/L and 16 mg/L, respectively. The $NO_2+NO_3$ concentration was still far beyond the maximum contaminant levels (MCLs) drinking water standard.

With the wastewater loading increase, we can obviously see that the concentrations of nitrogen reach a stable level after the 2-day treatment. That is to say, the dimension of wetland used in the experiments had been overdesigned due to the remarkable nitrogen removal of the media. Half of original dimension is more than enough. The complexity of nitrification rate has significant influence on the model accuracy. Further sensitivity analyses especially for the nitrification rate may certainly help with understanding the mechanism according to the nitrogen removal leading to modify the model up to a more sophisticated level in the future. Temperature (T), pH and dissolved oxygen (DO), all of them are the variables of the nitrification rate equation. Certain ranges of these three parameters were introduced to examine how they individually work on the nitrification rate.

As Table 7 shows, the nitrification rate is hardly affected by temperature. Instead, DO and pH value are critical for the nitrification. The lower level of DO resulted in an enlarged range of variation of nitrification rate presumably because of the Monod style expression. The G growth media layer had an extreme low DO value, 1.3 mg/L, which might explain the 31.18% decrease of the nitrification rate. Slightly acidic wastewater with pH as 6.67 also might produce a decrease of 27.49% in the nitrification rate.

TABLE 7

|  | DO, mg/L | | pH, unitless | | Temperature (° C.) | |
| --- | --- | --- | --- | --- | --- | --- |
|  | MIN | MAX | MIN | MAX | MIN | MAX |
| Sand layer | 2.87 (−5.16%) | 4.46 (+6.70%) | 6.86 (−11.66%) | 7.46 (+0.00%) | 26.1 (−0.35%) | 33.2 (+0.01%) |
| PC layer | 2.24 (−9.69%) | 4.56 (+7.11%) | 6.81 (−15.83%) | 7.35 (+0.00%) | 25.5 (−0.36%) | 33.6 (+0.00%) |
| G layer | 1.3 (−31.18%) | 3.77 (+2.35%) | 6.67 (−27.49%) | 7.4 (+0.00%) | 26.3 (−0.28%) | 33.1 (+0.03%) |

Recently, two more nitrogen transformations ANAMMOX (anaerobic ammonia oxidation) and nitrate-ammonification (conversion of ammonia to nitrate under anaerobic conditions) have been studied in the CWs and are described in Dong and Sun (2007). Both transformations might have contributed the high nitrogen removal efficiency in our study. However, the extent of these reactions in CWs is far from certain. There is still a lack of information about these processes in CWs and their role in treatment process (Vymazal, 2007). Thus, we temporarily count those effects as an integral part of generalized nitrification/denitrification in our model if they do exist. Even they can be confirmed, our system dynamic model will still be useful and applicable after just adding one set of transformation rate to respond to these two more nitrogen transformations.

In conclusion, this mathematical model describes the nitrogen removal process in the SUW by using system dynamics model. It is designed to simulate a new wetland system that exhibits high removal of nutrient and bacteria in the specific filtration beds integrated with plant species. The predicted and measured concentrations of the ON, $NH_4$ and $NO_2+NO_3$ in SUW were in good agreement. The ammonification rate constant ($k_a$) in designed media (PC media and G media) increased up to fivefold compared with that in sand layer. The denitrification rate constant in PC pollution control media is 30% more than that in sand layer and three times as much as in G growth media. Higher specific yield of nitrification rate ($u_N/Y_N$) was found in growth G media, which is the root zone layer. The vegetation with deeper root, which may reach the bottom of PC media, is recommended to plant to further increase the DO and nitrification rate and the $NH_4$ uptake during the initial period. The modified nitrification rate expression formula had been used in model validation and proved to be feasible. The sensitivity analyses showed that current dimension of wetland can be halved. In short, the developed mathematical model in this study could provide a dependable reference and tool for design of constructed subsurface upflow wetland, a competitive candidate of on-site wastewater treatment technologies.

One skilled in the art should realize that the particularities in the wastewater treatment system should not be construed as limitation of the preferred embodiment. Various system configurations and corresponding components may be chosen and optimized for a particular application to achieve a desired performance and other methods to determine pollution control media and plant growth media.

Septic Wastewater Treatment:

In an experiment for treatment of wastewater, wastewater was collected and pumped from the 15-person dormitory at the main campus of University of Central Florida (UCF) to a 3.78 m³ (1,000 gallon) septic tank. A subsequent dosing tank links the septic tank with the media filter. The single pump and pipe arrangement delivers an average of 0.75 m³/day (200 gpd) wastewater effluents from the septic tank to the media filter for functionality testing.

Figure 9:
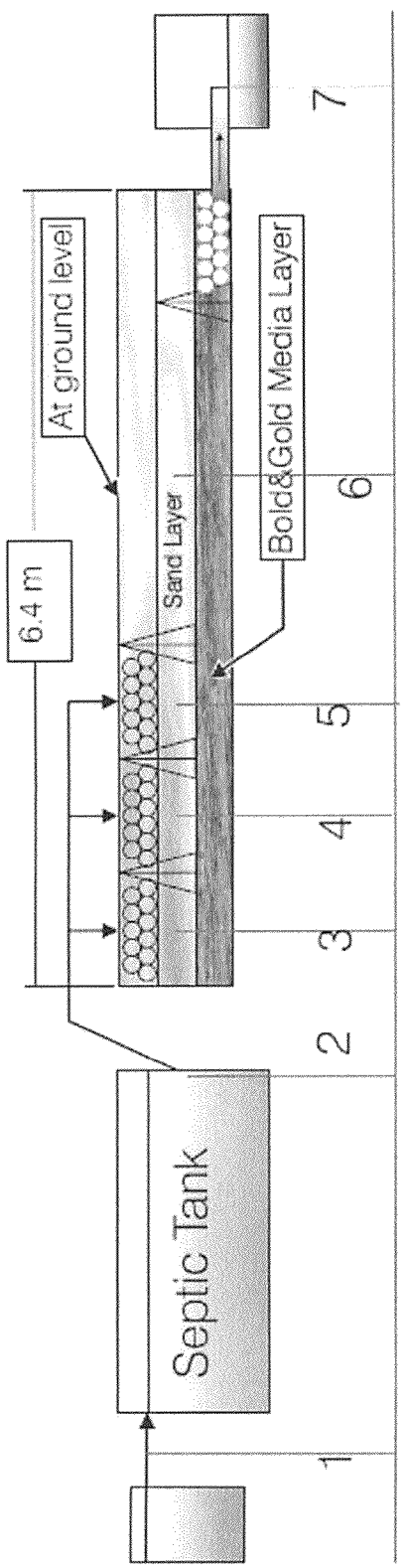
FIG. 9 is a schematic of the wastewater treatment system media filter.

FIG. 9 shows the schematic of the media filter with a 60 cm (24 inches)—sand layer on the top of the media filter, which is packed with Astatula sand, a kind of local sand in central Florida. From the left to the right, such a wastewater treatment system starts with a septic tank, an influent distribution system (e.g., a dosing tank), a piping system arranged for dosing the drainfield, and an underground cell including baffled compartments and a riser before the drain section. In the underground cell, the treatment process of the media filter was subdivided into three aerobic/anoxic zones and one anaerobic zone (e.g., marked from section 3 to 6 in FIG. 9). The upper part (i.e. sand part) of the aerobic zones was evenly partitioned into three sections by baffles to support the nitrification. An approximately 30 cm (12 inches)—thick green sorption material mixture layer (designed as anoxic zone in FIG. 9 was placed beneath the aerobic zone.

The inlet pipe for dosing was installed for equal distribution of the intermittent influent across the width of the media filter. Vertical pipes (i.e., oxygenators) inserted in the beginning of the media filter may also introduce air into the designed aerobic zone when needed. Such arrangements of the piping system for correct dosing and venting in concert with the internal partition using baffles and riser in the media filter sustain the essential functionality of these sorption media. It was expected that such a physical setting before the riser and after the baffle where there is a constant flooding zone would foster anaerobic environments to perform the denitrification whereas the initial venting may maintain a steady aerobic as a preparatory stage.

The green sorption material mixes that were placed in the flooding zone before the riser as a bottom layer has "green" implications because of the inclusion of recycled material as part of the media mixture. The green sorption material mixes used in this study include approximately 68% fine sand, approximately 25% tire crumb, and approximately 7% sawdust by volume. This innovative passive underground media filter (i.e., by gravity flow with no pump needed) is highly sustainable, which is designed to fit in any landscape to replace a conventional drainfield, and is highly applicable to a wide variety of septic tank designs. In all circumstances, the media filter was isolated by an impervious liner from the surrounding soil to keep all nitrification and denitrification processes in such a reactor filter. For the experiments, the disposal chamber is prepared for sampling purposes, which allows allow us to pump the treated effluents back to a nearby sewer line. Albeit infiltrate may percolate down into the vadose zone gradually if there is no sewer line in the neighborhood.

A lab-scaled experiment was carried out in which sorption isotherm and microcosm tests were used to prove the concept in early stage. From 2009 to 2010, comparative full-scale field testing was established to prove the advantageous features of passive onsite wastewater treatment technologies across several treatment trains at the University of Central Florida Test Center. In the field campaign, seven process steps and sampling points (marked from section 1 to 7 in FIG. 9 within the media filter system can be identified stepwise along the horizontal direction. The media filter was monitored biweekly. Samples were analyzed by Environmental Research and Design, Inc. (ERD), a National Environmental Laboratory Accreditation Conference (NELAC) certified laboratory in Orlando, Fla. In this study, three datasets collected in March 2009 were presented for addressing the water quality conditions and supporting the system dynamics modeling analysis. Dissolved oxygen (DO), pH, and temperature were measured on site using a HACH HQd field case. In addition to those parameters requiring a grab sample analysis mentioned above, ammonia, nitrite-nitrogen ($NO_2$—N), nitrate-nitrogen ($NO_3$—N), TN and TP were collected by the team and measured by ERD too.

Figure 10:
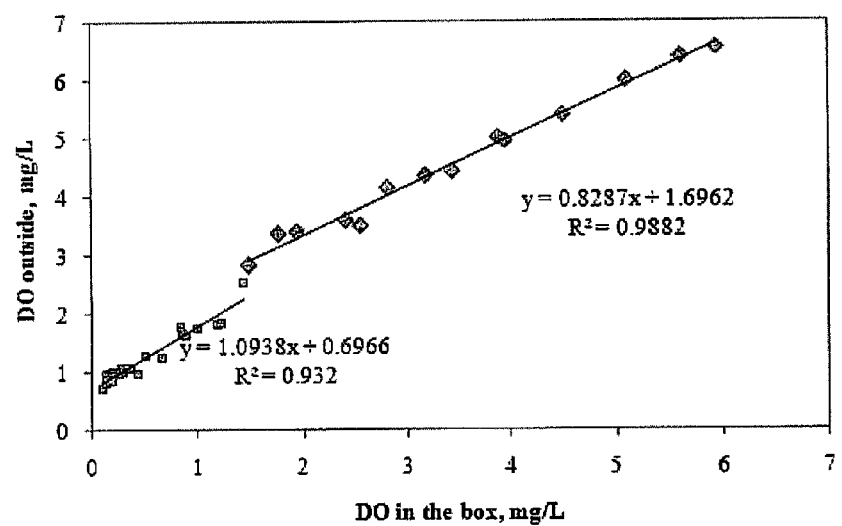
FIG. 10 is a graph showing the relationship between the DO value in the box and that outside the box.

All the samples were pumped out of the underground treatment system by a peristaltic pump. The longer it took for sampling, the greater was the chance of oxygen dissolution in outside environment. An imitation experiment was conducted to correct the high DO results. A water sample was put in a glove box filled with nitrogen gas, which mimicked an airtight underground environment. Different amount of nitrogen gas injection into water sample caused different DO readings. When the reading reached the expected value, the water sample was transferred by a peristaltic pump into another container out the glove box. The relationship between the DO value in the box and that outside the box is plotted in FIG. 10. It shows two linear subsection functions, a greater slope in low DO range. The DO values were calibrated based on these two functions.

System dynamics modeling, known as a well-established methodology specially for studying and managing complex feedback systems, has been used to address a variety of environmental/ecological studies including environmental impact assessment of coalfields, tree growth, lake eutrophication assessment, wetland study for metals, groundwater recharge, pesticide control, water reallocation, wastewater treatment, river pollution control, lake watershed management, lake toxics mass balance assessment and solid waste management.

With the aid of a tracer study to prove the concept of the flow patterns in a companion study providing visualized evidence as to how the flow move through the three compartments as defined in FIG. 9, compartmental modeling work was then applied with respect to the rates of nitrification and denitrification characterized by the collected field-scale dataset. A multi-compartmental model based on our assumed flow compartments accounting for aerobic, anoxic, and anaerobic reactive zones in the Drainfield filter (FIG. 9) were then used to fit experimental data to estimate chemical and microbiological metabolic parameters in the context of system dynamics model. Such a model typically has stationary, linear differential equations to describe the time behavior of chemical decay or enrichments in the different pools in terms of rate constants. These rate constants were estimated by fitting the experimental data with the solutions to some of the empirical differential equations. The system dynamics model also has algebraic equations, stemming from material balances on total amounts involving pool masses and the rate constants.

Figure 11:
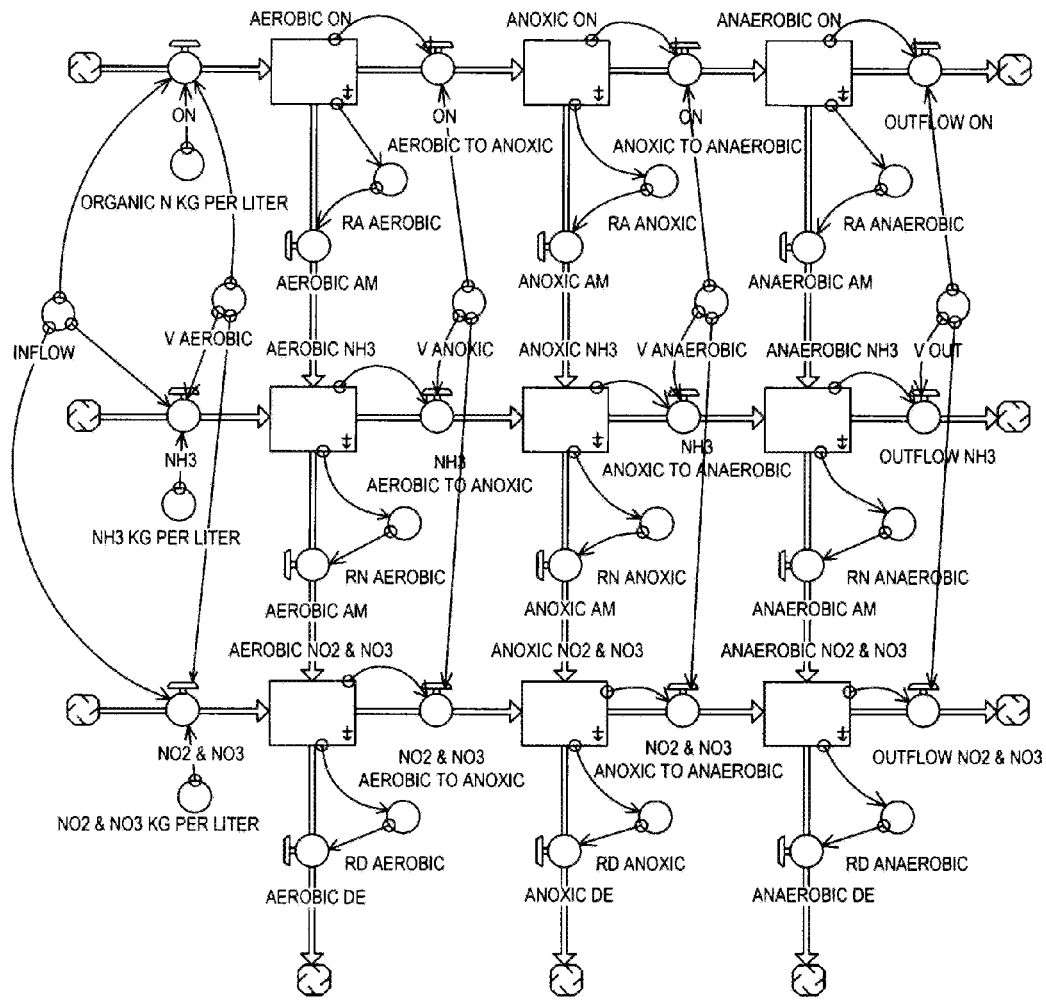
FIG. 11 is a flow diagram of nitrogen removal model.

In this study, STELLA®, an advanced graphical system programming dynamic software package, was used to develop the mathematical model for the media filter. The stock and flow diagram of nitrogen removal media filter is presented in FIG. 11. Sensitivity analysis was finally performed based on the identified rate constants and possible variability which were used to calculate varying direct nutrient removal under changing inflow conditions. It provides additional information about the robustness of this media filter treatment process.

The following equations 12-14 are used to predict the organic nitrogen (ON), $NH_3$ and the oxidized nitrogen ($NO_2$+$NO_3$). The unit form, μg/L/day, was used for all flows and stocks. Since the stocks have their own outflow to reach a steady state condition, the value in stock can be read as the "instantaneous concentration" in a unit volume or a point (i.e. sampling port). V is considered as the effective volume (product of volume and porosity) of each zone. Table 8 list the description of parameters in the multicompartment model all of which are required to be optimized (i.e., well-fitted) during the model calibration stage.

$$dON/dt = \frac{Q_{in}}{V_{in}}ON_{in} - \frac{Q_{out}}{V_{out}}ON_{out} - r_a \quad (12)$$

$$dNH_3/dt = \frac{Q_{in}}{V_{in}}NH_{3_{in}} - \frac{Q_{out}}{V_{out}}NH_{3_{out}} + r_a - r_n \quad (13)$$

$$d(NO_2+NO_3)/dt = \frac{Q_{in}}{V_{in}}(NO_2+NO_3)_{in} - \frac{Q_{out}}{V_{out}}(NO_2+NO_3)_{out} + r_n - r_d \quad (14)$$

TABLE 8

| Parameter | Description | Rate equations | Values |
|---|---|---|---|
| $k_a$ | Ammonification constant | $r_a = kaC_{ON}$ | Optimized |
| $u_N$ | Nitrosomonas growth rate | $r_n = \frac{u_N}{Y_N}e^{0.098(T-15)}[1-0.833(7.2-pH)]\left(\frac{C_{AN}}{1+C_{AN}}\right)\left(\frac{C_{DO}}{1.3+C_{DO}}\right)$ | Optimized |
| $Y_N$ | Nitrosomonas yield coefficient | $r_n = \frac{u_N}{Y_N}e^{0.098(T-15)}[1-0.833(7.2-pH)]\left(\frac{C_{AN}}{1+C_{AN}}\right)\left(\frac{C_{DO}}{1.3+C_{DO}}\right)$ | Optimized |
| $K_{20d}$ | Denitrification rate | $r_d = K_{20d}\theta_d^{(T-20)}$ | Optimized |

The performance of the media filter in regard to both the flow patterns and the removal efficiencies were tested and are shown in Table 9 which shows the results from three sets of data of nitrogen species collected in the media filter. It was observed that both nitrification and denitrification processes occurred in the filter.

TABLE 9

| Sample sources | NH$_3$ (μg/l) | | | NO$_2$ + NO$_3$ (μg/l) | | |
|---|---|---|---|---|---|---|
| | 4$^{th}$ | 18$^{th}$ | 31$^{st}$ | 4$^{th}$ | 18$^{th}$ | 31$^{st}$ |
| Septic effluent | 40,137 | 49,787 | 49,951 | 117 | 55 | 22 |
| Aerobic zone | 8,279 | 11,359 | 11,331 | 29,342 | 42,808 | 31,322 |
| Anoxic zone | 13,184 | 8,996 | 15,687 | 5,937 | 6,691 | 7,731 |
| Anaerobic zone | 16,609 | 13,726 | 16,638 | 9 | 18 | 8 |
| Removal efficiency (%) | | 65.9 ± 0 6.9 | | | 74.4 ± 15.6 | |

Figure 12:
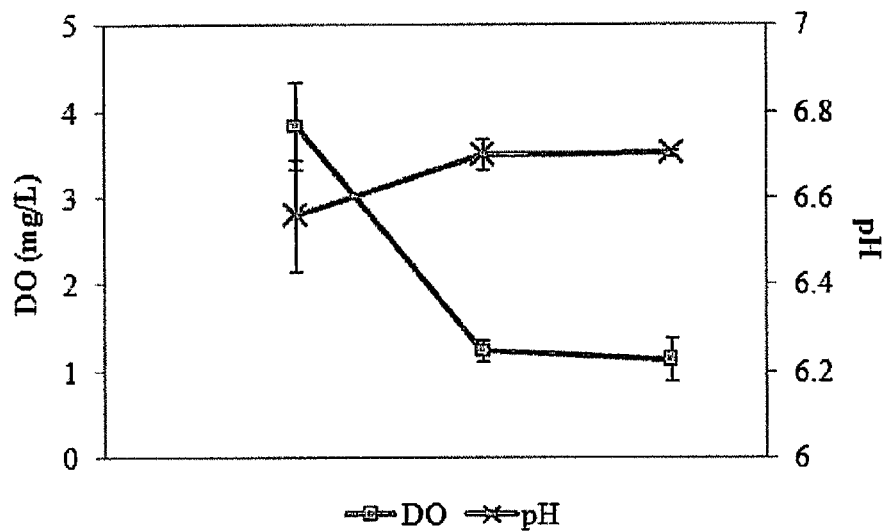
FIG. 12 shows tracking of DO and pH along the aerobic (left data points), anoxic (middle data points) and anaerobic (right data points) zones in the media filter system.

Approximately 65.9% of ammonia and approximately 74.4% of oxidized nitrogen were removed from the septic effluent, respectively. There was a trend of low organic nitrogen concentrations and high ammonia concentrations in septic effluent; then, ammonia concentration dramatically decreased when the wastewater traveled through the aerobic zone. Most of organic nitrogen had been converted to ammonia through ammonification in the septic tank. The aerobic zone offers a nitrification environment that was successful in oxidizing ammonia. Denitrification process was observed in the anaerobic zone where nitrate concentrations experienced considerable reduction. Besides, the stepped DO decrease and pH increase along the pathway in the media filter system proved the theory that denitrification is an oxygen-consuming and alkalinity-producing process as shown in FIG. 12. It supports expected relationships among the nitrogen species for nitrification and denitrification conditions.

Calibration is the process to find the best match between simulated and observed values. Table 10 shows the values of reaction rates and environmental parameters applied in simulation analyses.

TABLE 10

| | Rate equations | Unit | Aerobic zone | Anoxic zone | Anaerobic zone |
|---|---|---|---|---|---|
| $k_a$ | $r_a = k_a C_{ON}$ | day$^{-1}$ | 0.05 | 0.42 | 0.23 |
| $\frac{u_N}{Y_N}$ | $r_n = \frac{u_N}{Y_N} C_T C_{pH} \left( \frac{C_{DO}}{1.3 + C_{DO}} \right) C_{AN}$ | day$^{-1}$ | 3.96 | 0.32 | 0.006 |
| $K_{20d}$ | $r_d = K_{20d} \theta_d^{(T-20)} C_{NN}$ | day$^{-1}$ | 0.26 | 5.8 | 9.0 |
| DO | $r_n = \frac{u_N}{Y_N} C_T C_{pH} \left( \frac{C_{DO}}{1.3 + C_{DO}} \right) C_{AN}$ | mg/L | 4.42 | 1.33 | 1.41 |
| pH | $r_n = \frac{u_N}{Y_N} C_T C_{pH} \left( \frac{C_{DO}}{1.3 + C_{DO}} \right) C_{AN}$ | N/A | 6.54 | 6.70 | 6.71 |
| T | $r_n = \frac{u_N}{Y_N} C_T C_{pH} \left( \frac{C_{DO}}{1.3 + C_{DO}} \right) C_{AN}$ | ° C. | 26.4 | 24.2 | 23.9 |

Figure 13:
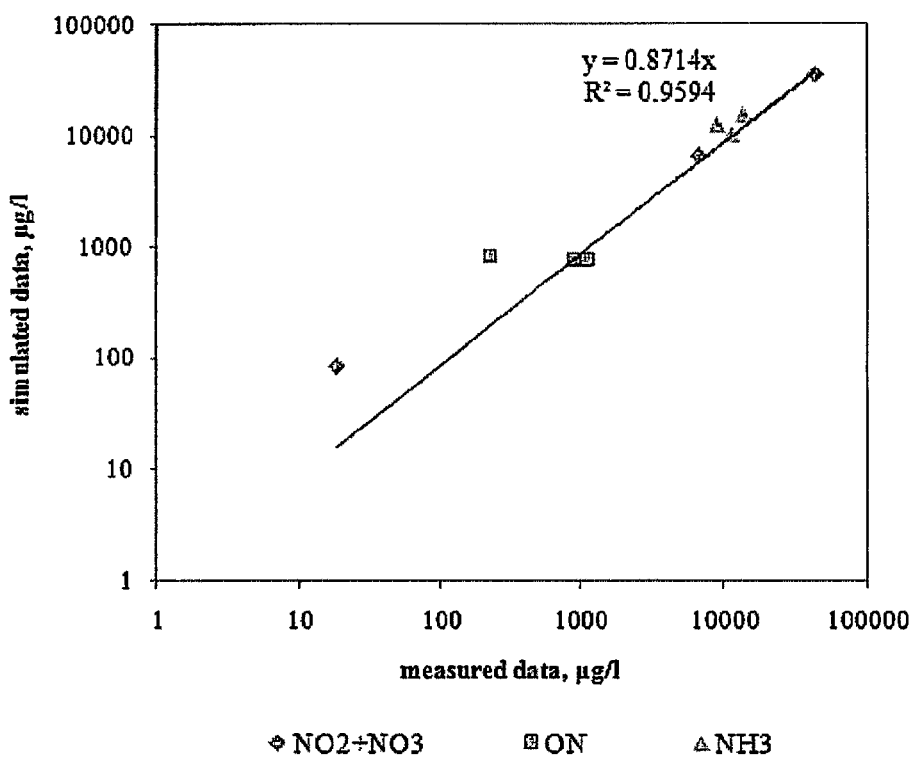
FIG. 13 is a graph showing the correlation between the measured and simulated values in model calibration.

The expression of nitrification rate was finally reorganized as Eq. 15. Then the model calibration followed along the direction of nutrient transport from aerobic to anaerobic zone and nitrogen transformation from organic nitrogen to oxidized nitrogen. The final agreement between the measured and simulated values of organic nitrogen (ON), ammonia (NH$_3$) and the sum of nitrite and nitrate (NO$_2$+NO$_3$) can be shown in FIG. 13. The slope of the regression line was 0.87, and the correlation (R$^2$) was 0.96, which supports the success of model calibration. The denitrification rate constant in anaerobic zone is 35 times larger than the value in aerobic zone whereas the nitrification rate is extremely high in aerobic zone. This observation verifies the design hypotheses.

$$r_n = \frac{u_N}{Y_N} C_T C_{pH} \left( \frac{C_{DO}}{1.3 + C_{DO}} \right) C_{AN} \quad (15)$$

in which $$C_T = \begin{cases} e^{0.098(T-15)}, & \text{for } T < 30° \text{ C.;} \\ e^{0.098(30-15)}, & \text{for } T \geq 30° \text{ C.;} \end{cases}$$

$$C_{pH} = \begin{cases} 1 - 0.833(7.0 - \text{pH}), & \text{for pH} < 7.0; \\ 1, & \text{for pH} \geq 7.0; \end{cases}$$

Figure 14:
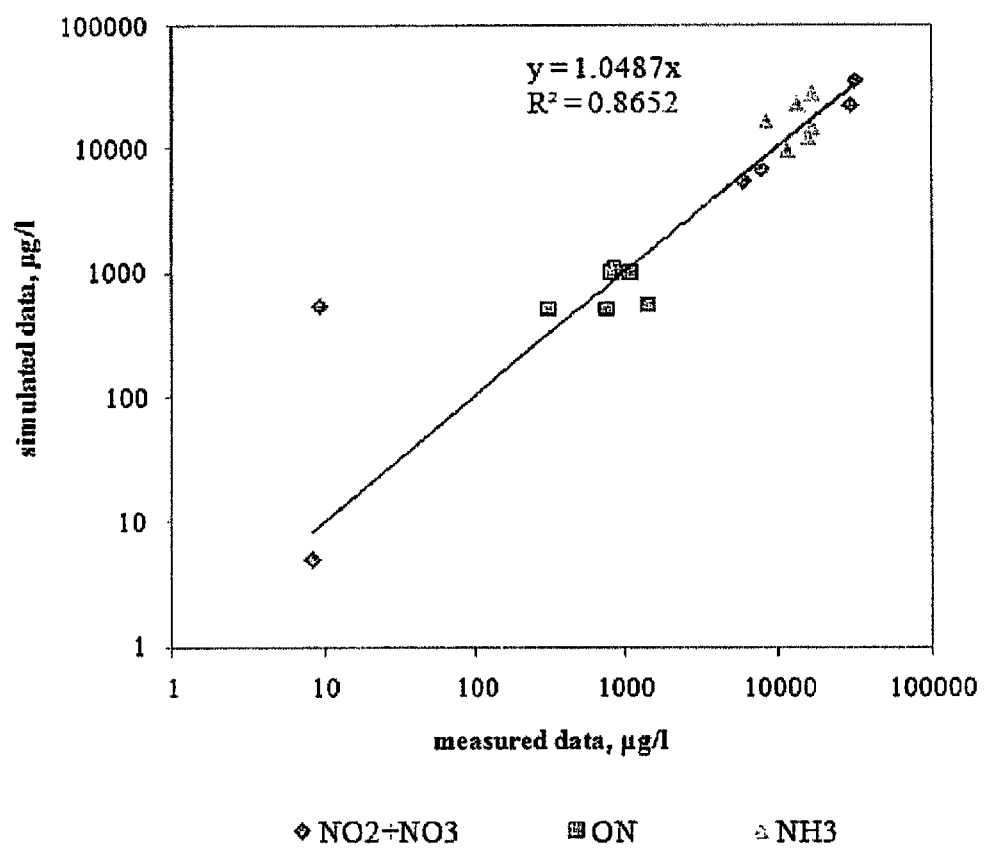
FIG. 14 is a graph showing correlation between the measured and simulated values in model validation.

The other two sets of data collected were used for model validation with the same reaction parameters. Table 11 lists the measured values of the other two sets of data. The correlation between the measured and simulated values is shown in FIG. 14. The slope of the regression line was 1.05 and correlation (R$^2$) was about 0.87, which shows the confirmation of the model validation. Most of points are close to the 45 degree line except one overrated oxidized nitrogen value.

TABLE 11

| | Unit | Aerobic zone | Anoxic Zone | Anaerobic zone |
|---|---|---|---|---|
| | | March 4 | | |
| DO | mg/L | 3.54 | 1.09 | 0.94 |
| pH | N/A | 6.44 | 6.66 | 6.70 |
| T | ° C. | 18.4 | 18.8 | 18.6 |
| | | March 31 | | |
| DO | mg/L | 3.54 | 1.30 | 1.05 |
| pH | N/A | 6.70 | 6.74 | 6.71 |
| T | ° C. | 25.7 | 23.4 | 24.5 |

Since the concentration of nitrogen species in septic tank effluent varies with the time, a sensitivity analysis is needed to make a model-based prediction of water quality in drainfield filter effluent reliable. Such sensitivity analysis may further provide improved understanding of how the variation (uncertainty) in the model output can be attributed to the varying nitrogen species concentrations due to the changing model inputs. With the aid of the calibrated and validated system dynamics model, Table 12 shows the corresponding ranges of effluent concentrations with ±30% fluctuations of influent nitrogen concentrations on the front of the septic tank system. In this sensitivity analysis, the variations of influent organic nitrogen concentration have the expected direct effect on the effluent ammonia concentration, while the influent nitrite and nitrate concentrations do not affect the effluent concentrations as expected.

TABLE 12

|  | Organic N | | Ammonia | | Oxidized N | |
| --- | --- | --- | --- | --- | --- | --- |
|  | (−30%) | (+30%) | (−30%) | (+30%) | (−30%) | (+30%) |
| Organic N | (−1.22%) | (+1.12%) | — | — | — | — |
| Ammonia | (−30.0%) | (+30.0%) | (−28.8%) | (+28.4%) | — | — |
| Oxidized N | (0.08%) | (+0.08%) | (−29.9%) | (+29.9%) | (−0.04%) | (+0.01%) |

As shown in Table 9, the ammonification rate in anoxic zone is much higher than that in the other two treatment zones. Most of organic nitrogen in the drainfield filter system starts to be converted to ammonia after traveling through aerobic zone. That's the reason why the variations of influent organic nitrogen concentration hardly affect the effluent nitrite and nitrate concentrations. However, the variations of influent ammonia concentrations directly may affect both effluent ammonia and $NO_2+NO_3$ concentrations due to the insufficient HRT and incomplete nitrification in aerobic zone. The remaining ammonia keeps being converted to $NO_2+NO_3$ gradually by consuming only a little oxygen along the anoxic and anoxic zones until the outlet of the system. As for the variations of influent $NO_2+NO_3$ concentrations, since the anaerobic zone has been designed to efficiently treat the low $NO_2+NO_3$ concentrations always, it would not affect the effluent $NO_2+NO_3$ concentrations too much.

In this experiment, the newly developed septic tank media filter for nutrient removal in a field-scale septic tank system was fully tested and presented as an integral part of the passive on-site wastewater treatment technology development. Such a new system was filled with customized green sorption media consisting of recycled products mixed with naturally occurring materials. Overall, 65.9% and 74.4% of ammonia and oxidized nitrogen were removed, respectively. In addition, the system dynamics model was proven useful and effective to improve the design philosophy of the media filter with specific varying technical settings as well as influent concentrations. The model showed good validation results based on the data collected from the field-scale testing. Such findings assist in designing a similar type of media filter for better nutrient removal to fit any landscape conditions in the future.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A subsurface upflow wetland for wastewater treatment comprising:
   a series of parallel treatment cells, each cell including from bottom to top:
   a layer of gravel;
   a layer of sand over the gravel to remove pathogens from a septic effluent;
   a pollution control medium above the sand layer to remove nutrients, total suspended solid, and biochemical oxygen demand; and
   a growth media mixture layered on top of the pollution control media to grow plants; and
   a gravity distribution system to distribute effluent to the series of parallel treatment cells.

2. The subsurface upflow wetland of claim 1 wherein the gravity distribution system comprises:
   a gravel filled gravity distribution system.

3. The subsurface upflow wetland of claim 2 wherein the gravity distribution system further comprises:
   a header pipe;
   a distribution pipe,
   a collection pipe; and
   a flow meter.

4. The subsurface upflow wetland of claim 3 wherein the gravity distribution system further comprises:
   a planted bed of green sorption media with an underdrain collection system.

5. The subsurface upflow wetland of claim 1 further comprising:
   a pipe having a fabric filter at one end inserted into the gravel layer to introduce oxygen for promoting nitrification.

6. The subsurface upflow wetland of claim 1 wherein at least one of the following criteria is used to select the plants grown in the growth media mixture:
   native plants for long term survival;
   perennial plants that survive all year and do not need to be replanted after harvesting;
   a rooting system for nitrification;
   high yield to evaporate water;
   high protein content; and
   plants tolerant to trimming and grazing.

7. The subsurface upflow wetland of claim 1 wherein the pollution control medium comprises:
   at least one recycled material; and
   at least one naturally occurring material.

8. The subsurface upflow wetland of claim 7 wherein at least one of the following criteria is used to select the pollution control medium and the growth media mixture:
   nitrification;
   denitrification;
   hydraulic permeability;
   removal efficiency related to adsorption, precipitation and filtration capacity; and
   environmental benefits.

9. The subsurface upflow wetland of claim 8 wherein the recycled material comprises at least one of:
   tire crumb and compost.

10. The subsurface upflow wetland of claim 9 wherein the natural material comprises at least one of:
    sand and limestone.

11. The subsurface upflow wetland of claim 10 wherein the pollution control medium consists of:
recycled tire crumb, sand and limestone.

12. The subsurface upflow wetland of claim 10 wherein the pollution control medium consists of:
recycled tire crumb, compost, sand and limestone.

13. The subsurface upflow wetland of claim 10 wherein the pollution control medium consists of:
approximately 50% sand, approximately 20% tire crumb, approximately 10% compost and approximately 20% limestone.

14. A method for wastewater treatment comprising the steps of:
providing a horizontal underground cell to host an alternating cycle of aerobic and anoxic environments;
layering gravel at the bottom of the horizontal underground cell;
layering sand on the layer of gravel;
mixing one or more recycled material selected from a group consisting essentially of tires and compost and one or more naturally occurring materials as a green sorption material mixture;
layering a green sorption material mixture on top of the sand layer to provide an anoxic environment;
layering a plant growth medium on top of the pollution control medium; and
providing a gravity distribution system for distributing an influent into the horizontal underground cell to remove a nutrient content in wastewater.

15. The method of claim 14 further comprising the step of:
using the method in conjunction with an underground septic tank system as an alternating cycle of aerobic and anoxic environments to remove nutrient content from the influent.

16. The method of claim 14 wherein the green sorption material mixture mixing step comprises the steps of:
selecting one or more recycled materials selected from a group consisting of tire crumb, compost, tree bark, wood chips, paper, alfalfa, mulch, cotton and wheat straw; and
selecting one or more naturally occurring materials selected from a group consisting of peat, sands, zeolites, limestone and clay.

17. The method of claim 16 further comprising the step of:
selecting one of the one or more recycled materials from a subgroup including sawdust, compost and paper as electron donors in a drainfield.

18. The method of claim 17 further comprising the step of:
selecting tire crumb as one of the one or more recycled materials for nutrient removal.

19. The method of claim 18 wherein the green sorption material mixture mixing step consists of:
mixing sand, tire crumb, limestone and compost.

20. The method of claim 19 wherein the mixing step consists of:
mixing approximately 50% sand, approximately 20% tire crumb, approximately 10% compost and approximately 20% limestone.

21. The method of claim 20 wherein the mixing step further comprises the step of:
mixing 75% expanded clay, 10% vermiculate and 15% peat moss as the plant growth medium.

22. The method of claim 18 wherein the mixing step consists of:
mixing sand, tire crumb and limestone.

23. The method of claim 14 wherein providing a gravity distribution system comprises the steps of:
providing an inlet in the gravel layer to introduce the effluent into the horizontal underground cell;
providing a distribution pipe to distribute the effluent from the inlet to the horizontal underground cell;
providing an outlet pipe to release overflow; and
providing a flow meter to monitor the wastewater in the horizontal underground cell.

24. The method of claim 23 wherein the providing a gravity distribution system comprises the steps of:
positioning one or more outlet pipes in the horizontal underground cell approximately between the growth medium and the pollution control medium; and
inserting an air inlet port with a fabric filter at bottom into the gravel layer to introduce more oxygen for promoting nitrification.

25. The method of claim 14 wherein the plant growth medium mixing step further comprises the step of:
mixing expanded clay, vermiculate and peat moss as the plant growth medium.

* * * * *